US010556668B2

(12) United States Patent
Grohmann et al.

(10) Patent No.: US 10,556,668 B2
(45) Date of Patent: Feb. 11, 2020

(54) ARTIFICIAL FORCE FEEL GENERATING DEVICE FOR A VEHICLE CONTROL SYSTEM OF A VEHICLE AND, IN PARTICULAR, OF AN AIRCRAFT

(71) Applicant: AIRBUS HELICOPTERS DEUTSCHLAND GMBH, Donauworth (DE)

(72) Inventors: Boris Grohmann, Munich (DE); Thomas Rohr, Augsburg (DE); Jens Klaubert, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 858 days.

(21) Appl. No.: 15/071,657

(22) Filed: Mar. 16, 2016

(65) Prior Publication Data

US 2016/0304190 A1    Oct. 20, 2016

(30) Foreign Application Priority Data

Mar. 20, 2015 (EP) ..................... 15400013

(51) Int. Cl.
*B64C 13/08* (2006.01)
*B64C 13/50* (2006.01)
(Continued)

(52) U.S. Cl.
CPC .......... *B64C 13/507* (2018.01); *B64C 13/044* (2018.01); *B64C 13/0421* (2018.01);
(Continued)

(58) Field of Classification Search
CPC ........ B64C 13/22; B64C 13/46; B64C 27/605
See application file for complete search history.

(56) References Cited

U.S. PATENT DOCUMENTS 2,955,779 A * 10/1960 Carter, Jr. ............... B64C 27/82
                                                                244/17.21
4,106,728 A * 8/1978 Griffith ................. B64C 13/341
                                                                244/223
(Continued)

FOREIGN PATENT DOCUMENTS

| EP | 2266878  | 12/2010 |
|----|----------|---------|
| EP | 2311729  | 4/2011  |
| WO | 03081554 | 10/2003 |

OTHER PUBLICATIONS

Extended European Search Report for European Application No. 154000131, Completed by the European Patent Office, dated Feb. 29, 2016, 4 Pages.

*Primary Examiner* — Philip J Bonzell
*Assistant Examiner* — Michael B. Kreiner
(74) *Attorney, Agent, or Firm* — Brooks Kushman P.C.

(57) ABSTRACT

An artificial force feel generating device for generation of an artificial feeling of force on an inceptor of a vehicle control system, the inceptor being adapted for controlling a servo-assisted control unit of the vehicle control system via a mechanical linkage, wherein at least one first force generating device and at least one second force generating device are mechanically connected to the inceptor, the first force generating device being provided for generating a nominal force acting in operation on the inceptor and the second force generating device being provided for generating a tactile cue force acting in operation on the inceptor, the first and second force generating devices being arranged in parallel. The invention relates further to an aircraft comprising such an artificial force feel generating device.

21 Claims, 12 Drawing Sheets

(51) Int. Cl.
*B64C 13/04* (2006.01)
*B64C 13/28* (2006.01)
*B64C 13/22* (2006.01)
*B64C 27/04* (2006.01)
*B64C 27/605* (2006.01)
*B64C 27/64* (2006.01)

(52) U.S. Cl.
CPC .......... *B64C 13/0427* (2018.01); *B64C 13/08* (2013.01); *B64C 13/22* (2013.01); *B64C 13/341* (2018.01); *B64C 13/505* (2018.01); *B64C 27/04* (2013.01); *B64C 27/605* (2013.01); *B64C 27/64* (2013.01); *Y02T 50/44* (2013.01)

(56) References Cited

U.S. PATENT DOCUMENTS

| | | | | |
|---|---|---|---|---|
| 4,206,891 A * | 6/1980 | Perez | .................... | G05D 1/0061 244/17.13 |
| 5,076,517 A * | 12/1991 | Ferranti | .................. | B64C 13/04 244/228 |
| 5,428,543 A * | 6/1995 | Gold | .................... | G05D 1/0669 244/17.13 |
| 6,195,599 B1 * | 2/2001 | Laffisse | ................ | G05D 1/0858 244/17.11 |
| 6,334,592 B1 * | 1/2002 | Tomio | .................. | G05D 1/0825 244/221 |
| 7,098,811 B2 * | 8/2006 | Augustin | ................ | B64C 13/46 340/965 |
| 7,108,232 B2 * | 9/2006 | Hoh | ........................ | B64C 13/04 244/223 |
| 7,890,222 B1 * | 2/2011 | Shultz | ................... | B64C 13/30 701/3 |
| 7,930,074 B2 * | 4/2011 | Cherepinsky | ........ | G05D 1/0858 701/12 |
| 8,025,256 B2 * | 9/2011 | Miller | ..................... | B64C 13/10 244/194 |
| 8,050,780 B2 * | 11/2011 | Tessier | .................... | B64C 13/04 700/63 |
| 8,056,432 B2 * | 11/2011 | Hanlon | ..................... | G05G 5/05 74/471 XY |
| 8,087,619 B2 * | 1/2012 | Hanlon | ................... | B64C 13/04 244/223 |
| 8,271,151 B2 * | 9/2012 | Hasan | ..................... | B64C 13/00 701/3 |
| 8,376,283 B2 * | 2/2013 | Grieser | .................. | B63H 25/10 244/178 |
| 8,622,349 B2 | 1/2014 | Allieta et al. | | |
| 8,655,509 B2 * | 2/2014 | Shirota | ................. | B64C 13/345 701/3 |
| 8,746,627 B2 * | 6/2014 | Koo | ......................... | G09B 9/28 244/223 |
| 8,812,177 B2 * | 8/2014 | Yates | ...................... | B64C 13/08 701/3 |
| 9,003,914 B2 * | 4/2015 | Robic | ..................... | B64C 13/04 74/471 XY |
| 9,031,718 B2 * | 5/2015 | Higuchi | .................. | B64C 13/44 701/4 |
| 9,051,836 B2 * | 6/2015 | Yates | ......................... | F01D 7/00 |
| 9,102,400 B2 * | 8/2015 | Cherepinsky | ........... | B64C 13/04 |
| 9,156,546 B2 * | 10/2015 | Irwin | ...................... | B64C 13/10 |
| 9,381,998 B2 * | 7/2016 | Taylor | ..................... | B64C 13/46 |
| 9,643,717 B2 * | 5/2017 | Grohmann | .............. | B64C 13/42 |
| 9,764,830 B2 * | 9/2017 | Yates | ..................... | B64C 13/04 |
| 9,868,513 B2 * | 1/2018 | Sandri | ..................... | B64C 13/18 |
| 10,030,756 B2 * | 7/2018 | Wilkens | ................. | B64C 13/04 |
| 2009/0178503 A1 * | 7/2009 | Hanlon | ..................... | G05G 5/03 74/471 XY |
| 2010/0123045 A1 | 5/2010 | Grieser | | |
| 2017/0212514 A1 * | 7/2017 | Taylor | .................. | G05D 1/0077 |
| 2018/0334245 A1 * | 11/2018 | Grohmann | .............. | B64C 13/04 |

* cited by examiner

ARTIFICIAL FORCE FEEL GENERATING DEVICE FOR A VEHICLE CONTROL SYSTEM OF A VEHICLE AND, IN PARTICULAR, OF AN AIRCRAFT

CROSS REFERENCE TO RELATED APPLICATION

This application claims priority to European patent application No. EP 15400013.7 filed on Mar. 20, 2015, the disclosure of which is incorporated in its entirety by reference herein.

BACKGROUND OF THE INVENTION (1) Field of the Invention

The present invention is related to an artificial force feel generating device for generation of an artificial feeling of force on an inceptor of a vehicle control system. The invention is further related to an aircraft with a vehicle control system that comprises an artificial force feel generating device for generation of an artificial feeling of force on an inceptor of said vehicle control system.

(2) Description of Related Art

Artificial force feel generating devices are frequently used in vehicles that are controllable in a flowing medium, such as air or water, and that are provided with servo-assisted control units that are controlled by suitable associated inceptors, such as control sticks, control columns, sidesticks, pedals, steering wheels and so on. For instance, artificial force feel generating devices are used in aircrafts, such as airplanes and helicopters, or in watercrafts, such as ships, boat, hovercrafts and submarines.

By way of example, an artificial force feel generating device that is used in an aircraft is usually adapted for generating artificial breakout forces for an inceptor of a given servo-assisted control unit, such as a rudder, and additional optional artificial force gradients for convenient control of this inceptor by the pilot. The artificial breakout forces and additional optional artificial force gradients are forces that need to be overcome by the pilot when moving the inceptor from a predetermined neutral position into a respective operating position desired by the pilot.

The predetermined neutral position is a position of the inceptor that corresponds to a preferred motion direction of the aircraft and that is generally characterized in that in it no forces act on the inceptor. In other words, no forces need to be applied onto the inceptor in operation for keeping it in its neutral position.

A reel, e.g. centering and/or anchoring, feeling of the artificial breakout forces and the additional optional artificial force gradients usually becomes noticeable to the pilot of the aircraft when the inceptor passes a so-called trim point on its travel from the neutral position to the respective desired operating position. This trim point is slidable, i.e. adjustable within a defined control range by means of a trim coupling and/or a trim motor. However, in order to enable the pilot to sensitively control the aircraft, the artificial forces generated by the artificial force feel generating device, i.e. the artificial breakout forces and the additional optional artificial force gradients, should be relatively moderate.

If an automatic flight control system (AFCS) is used with the aircraft, the artificial breakout forces are usually used to support a respective input of AFCS actuator signals onto the inceptor. The forces that can be applied to the inceptor by such an AFCS are, thus, limited by the artificial breakout forces.

In operation of the aircraft, any overcoming of the artificial breakout force or movement in the region of the additional optional artificial force gradients is generally assessed by the AFCS as being an intended intervention by the pilot and, thus, results in temporary degradation of the AFCS operating mode in order to prevent the pilot and the AFCS from working against each other. Depending on the type of aircraft and a given flight situation, degradation of the AFCS operating mode can take place to a different extent.

For example, complete degradation of the AFCS operating mode is imaginable so that control of the aircraft takes place exclusively as a result of the manual control intervention of the pilot. However, partial degradation is also possible, in which the aircraft continues to be stabilized by the AFCS, while the pilot handles the trajectory control input via manual control intervention, for example the flight direction or altitude.

A complete degradation provides the pilot with a direct intervention option in the control and in unequivocal automatic degradation of the AFCS operating mode in favor of manual control by the pilot. This design allows preventing situations in which the AFCS and the pilot unintentionally work against each other, which might otherwise lead to critical flight situations. However, such a direct intervention option for the pilot requires moderate breakout forces in order to make comfortable manual control possible.

The entire breakout forces are composed of the component friction in the control system and the additional artificial breakout forces to support the AFCS operating mode. Since the entire breakout forces are to be overcome by the pilot, there is a disadvantage in that in the case of substantial undesirable component friction it is only possible to select slight artificial breakout forces to support the AFCS operating mode and, consequently, this results in high sensitivity of the system to any unintended intervention by the pilot. However, in this case an unintended bumping against the inceptor, or an unintended fixing of the inceptor by the pilot, may result in complete degradation of the AFCS operating mode, without this being intended and/or noticed by the pilot. Furthermore, as has already been mentioned, slight, i.e. small artificial breakout forces also limit the forces that can be exerted on the inceptor in the AFCS operating mode.

In contrast thereto, a partial degradation allows the AFCS operating mode to remain active until it is intentionally degraded by the pilot with the use of a switch or a contact sensor on the inceptor. This design results in improved robustness to unintended pilot intervention, but the absence of automatic degradation during pilot intervention may lead to critical flight situations, as described above. Activating the switch or the contact sensor on the inceptor generally results in decoupling of an underlying trim coupling, as a result of which a trim motor, via which the AFCS operating mode intervenes, is decoupled from the inceptor. Such decoupling generally also results in a reduction in the breakout forces, e.g. by partial or complete decoupling of the artificial breakout forces.

The pilot is then in a position to carry out manual control of the aircraft with reduced breakout forces. Furthermore, it is possible to use increased artificial breakout forces in the AFCS operating mode and, thus, to increase the range of forces for the AFCS operating mode, because manual control by the pilot takes place with partial or complete decoupling of these artificial breakout forces. However, decoupling of the trim motor generally also results in the loss of the original trim point, which is often perceived by the pilot as being disagreeable, as after termination of manual intervention the trim point must be newly adjusted.

Furthermore, combinations of the above described designs exist, in which degradation of the AFCS operating mode can take place either by way of direct intervention by the pilot or by overcoming the entire breakout forces and by activation of a switch or of a contact sensor on the inceptor. These combinations are, however, also associated with the already mentioned disadvantages in that the artificial breakout forces that are available to the AFCS operating mode for acting on the inceptor need to be moderate in order to make manual intervention by the pilot possible, and in that during decoupling of the trim coupling the trim point is lost.

Exemplary artificial force feel generating devices are e.g. described by the documents EP 2 266 878 B1, EP 2 311 729 A1 and US 2010/0123045 A1. In these exemplary artificial force feel generating devices, a force applied to a corresponding inceptor by the pilot is measured by an external force or pressure sensor for controlling the devices on the basis of the measured force.

However, in all of the above described conventional artificial force feel generating devices, electric motors are immediately connected to corresponding spring units for directly loading these spring units such that they provide an associated servo-assisted control unit with a generated artificial feeling of force. Thus, in case of loss of electrical power or in case of loss of the electric motors as such, the generated artificial feeling of force will also be lost.

A further major inconvenient of the conventional artificial force feel generating devices consists in their inadequacy for implementing flight domain limitation and limit indication for the purpose of carefree handling of an aircraft and, in particular, of a rotary wing aircraft such as a helicopter. More specifically, helicopters, as well as aircrafts in general, are subject to flight domain limitations, such as thermal and/or mechanical engine limitations, gearbox torque limitations, structural load limitations, performance limitations and stability limitations.

Other flight domain limitations are e.g. related to preferred flight paths or so-called "tunnels in the sky", i.e. avoidance of man-made obstacles, specific terrains or traffic. Furthermore, in helicopters having a bearingless main rotor, a respective mast bending moment of a given rotor mast of the main rotor in operation defines an important structural limitation that pilots have to consider during flight for not damaging the helicopter. If any one of these limitations is exceeded, an unscheduled and expensive maintenance action can be required.

Usually, flight domain limitation is implemented in aircrafts in the framework of so-called fly-by-wire systems, where there is no direct mechanical connection between a given inceptor and respectively controlled flight control surfaces. In other words, currently there is no flight domain limitation implemented by means of kinematics of mechanical flight controls. Instead, only specific limitations are monitored by dedicated devices. For instance, the mast bending moment is visualized by a one- or two-dimensional optical display and/or a so-called first limit indication is provided by an optical instrument that depicts a current status of engine and gearbox in comparison to predetermined limitations of, e.g., temperature, torque and/or speed. Furthermore, the above described conventional artificial force feel generating devices are used to provide tactile feedback to the pilots.

However, all of these measures only result in an increased workload of the pilot who must look at the various instruments during flight and interpret a respective behavior of the inceptor. This increased workload may result in intended or unintended damaging actions of the pilot that may lead, e.g., to an excessive mast bending moment, an excessive engine temperature or an excessive gearbox torque, which would require the above mentioned unscheduled maintenance action or reduced intervals for scheduled maintenance. Furthermore, the required dedicated devices are difficult to retrofit as generally flight control kinematics may not be compatible.

BRIEF SUMMARY OF THE INVENTION

It is, therefore, an object of the present invention to provide a new artificial force feel generating device, which is adapted for implementing flight domain limitation and limit indication for the purpose of carefree handling of an aircraft and, in particular, of a rotary wing aircraft such as a helicopter.

More specifically, according to the present invention an artificial force feel generating device is provided for generation of an artificial feeling of force on an inceptor of a vehicle control system. The inceptor is adapted for controlling a servo-assisted control unit of the vehicle control system via a mechanical linkage. At least one first force generating device and at least one second force generating device are mechanically connected to the inceptor. The first force generating device is provided for generating a nominal force acting in operation on the inceptor and the second force generating device is provided for generating a tactile cue force acting in operation on the inceptor. The first and second force generating devices are arranged in parallel.

Advantageously, the inventive artificial force feel generating device allows providing the nominal force and the tactile cue force by means of two separate force generating units that are independent from each other and arranged in parallel. Therein, preferably at least the nominal force is generated by mechanical means, such as spring units and/or friction units, so that in case of loss of electrical power supply or in case of loss of corresponding electrical motors at least an artificial feeling of the nominal force is not lost, i.e. not altered. Thus, a required training duration for drivers of the vehicle can be minimized.

The tactile cue force is preferably generated by motor torque of an electrical motor or a suitable actuator and summed to the nominal force due to the parallel arrangement of the two separate force generating units. According to one aspect of the present invention, the motor torque of the electrical motor or a suitable actuator is physically limited so that it is always overridable by the pilot with limited overriding forces. However, as the tactile cue force is generated by motor torque with known performance characteristics via electrical current, no external force sensor and no special requirements for corresponding control kinematics are needed in the vehicle control system.

According to one aspect, suitable damping units are used for providing parallel resistance and a backup damping in case of failure of the second force generating device that generates the tactile cue force. Furthermore, a vehicle driver and/or co-driver of the vehicle is preferably informed about any loss of the tactile cue force in operation.

Advantageously, the artificial force feel generating device according to the present invention is easy to retrofit to an existing vehicle fleet since, in contrast to the conventional artificial force feel generating devices described above, no external force or pressure sensors with specific kinematics arrangements are required. Furthermore, the artificial force feel generating device with the first and second force generating devices according to the present invention allows a limitation or reduction of structural loads, which leads to a reduction of mass of structure of the vehicle.

According to a preferred embodiment of the invention, the first force generating device comprises at least one mechanical force generating unit.

According to a further preferred embodiment of the invention, the at least one mechanical force generating unit is a spring unit.

According to a further preferred embodiment of the invention, the at least one mechanical force generating unit is a friction unit.

According to a further preferred embodiment of the invention, the first force generating device comprises a coupling unit coupling the at least one mechanical force generating unit to the inceptor. The coupling unit is activatable for de-coupling the at least one mechanical force generating unit from the inceptor while the second force generating device remains mechanically connected to the inceptor. Preferably, the coupling unit is activatable by a vehicle driver and/or a co-driver of the vehicle and/or by an automatic motion control system of the vehicle.

According to a further preferred embodiment of the invention, an electrical motor is provided for shifting a predetermined trim position of the inceptor on request of an automatic motion control system or a vehicle driver. This is preferably achievable via a so-called beep trim.

According to a further preferred embodiment of the invention, a safety unit is provided for limiting authority of the first and/or second force generating devices.

According to a further preferred embodiment of the invention, the first and second force generating devices are connected to the inceptor by means of a rotary output unit that is connected to a position sensor adapted for monitoring a rotational position of the rotary output unit in operation, and wherein a safety unit is provided that is adapted for disconnecting the first and/or second force generating devices from the inceptor while the position sensor remains connected to the inceptor.

According to a further preferred embodiment of the invention, the second force generating device comprises at least one electrical force generating unit.

According to a further preferred embodiment of the invention, the at least one electrical force generating unit is an electrical motor.

According to a further preferred embodiment of the invention, power electronics are provided for controlling the electrical motor.

According to a further preferred embodiment of the invention, the tactile cue force is limited for being overridable by a vehicle driver operating the inceptor.

Preferably, the tactile cue force is limited by a torque limiting device, such as e.g. a mechanical slipping clutch, for being overridable by the vehicle driver. Alternatively, or additionally, the tactile cue force is physically limited by an underlying design of an electrical motor for being overridable by a vehicle driver, wherein the electrical motor is adapted for generating the tactile cue force. Physically limiting the electrical motor may e.g. be performed by setting a maximum saturation of an underlying magnetic circuit of the electrical motor.

According to a further preferred embodiment of the invention, the vehicle control system comprises an automatic motion control system that is adapted for driving the second force generating device.

According to a further preferred embodiment of the invention, the automatic motion control system is adapted for driving the second force generating device on the basis of sensor information obtained via at least one associated sensor.

According to a further preferred embodiment of the invention, the vehicle is a rotary wing aircraft, preferably a helicopter, and the at least one associated sensor comprises at least one of a rotor mast bending moment sensor, a helicopter on ground sensor, a main gearbox torque sensor, a main engine speed and/or temperature sensor, an air speed, air density and/or outside air temperature sensor and/or an obstacle detecting rotor strike alerting sensor.

According to a further preferred embodiment of the invention, the vehicle control system comprises a vehicle management system that is electrically connected to the at least one associated sensor. The vehicle management system is connected to the automatic motion control system for providing the sensor information to the automatic motion control system.

Advantageously, by analyzing all kind of sensor information, the artificial force feel generating device according to the present invention can be used for implementing an advanced flight domain limitation. This increases an overall operational safety of the rotary wing aircraft.

According to one aspect of the present invention, at least sensor information from a rotor mast bending moment sensor is analyzed for providing a pilot of the rotary wing aircraft with information about a current direction of mast moment limitation via the artificial force feel generating device, so that the workload of the pilot is reduced, as he does not need to look on visualizing instruments any more. In fact, the mast moment limitation would be felt "naturally" during piloting. Thus, a respective situational awareness of the pilot can be improved.

According to another aspect of the present invention, at least sensor information from a main gearbox torque sensor is analyzed for providing a pilot of the rotary wing aircraft with information about a current torque produced by the main gearbox, so that excessive torque generation and, thus, damage of the main gearbox or other components of the rotor due to an unintended pilot action can be avoided. By avoiding such damage, additional unscheduled maintenance can be avoided, thereby avoiding an unexpected aircraft-on-ground condition. Thus, unnecessary additional cost can be avoided likewise.

According to still another aspect of the present invention, at least sensor information from an obstacle detecting rotor strike alerting sensor is analyzed for providing a pilot of the rotary wing aircraft with information about existence of obstacles during a given flight mission. Thus, a collision with such obstacles can be avoided easily.

According to still another aspect of the present invention, at least sensor information concerning speed of forward flight and air density (or outside air temperature and air pressure as equivalent) is used to limit or even reduce aerodynamic loads on the tail boom, fenestron by limiting the stroke and speed of pilot command input as a function of air speed in forward flight and air density (OAT, . . . ).

According to a further preferred embodiment of the invention, the first and second force generating devices are connected to the inceptor by means of a rotary output unit.

According to a further preferred embodiment of the invention, the nominal force and the tactile cue force act in operation on the inceptor for moving the inceptor into a neutral position. The neutral position defines a trim point that determines a preferred motion direction of a vehicle that comprises the inceptor.

According to a further preferred embodiment of the invention, the vehicle is an aircraft or a watercraft and, preferably, a helicopter. Of course, in this case the driver of the vehicle is a pilot and the automatic motion control system is an AFCS.

According to one aspect of the present invention, in the case of a helicopter and with respect to cyclic pitch control by means of a cyclic stick, the first force generating device is preferably embodied as a conventional, standard trim actuator, i.e. a trimmable centering spring, with a trim-follow-up capability, which provides the nominal force by a spring device with trim release. A respective spring force provided by the spring unit, which defines the nominal force, is preferably controlled via an electrical motor that is commanded by means of a pulse width modulated control signal generated by a power stage, i.e. power electronics, included in an already existing AFCS, so that existing interfaces can be used.

In contrast thereto, in the case of a helicopter and with respect to collective pitch control by means of a collective stick or with respect to yaw control by means of pedals, the first force generating device is preferably embodied as a conventional, standard trim actuator, which provides the nominal force by a mechanical friction device with trim release.

The second force generating device is preferably embodied as a tactile cue actuator, which is configured such that tactile cues are not lost in case of force trim release. Preferably, the tactile cues are configured via bus command and a local control and monitoring of the tactile cue actuator is provided for generation of the tactile cues, such as e.g. a position-torque gradient, a suitable damping and/or rate limitation.

Furthermore, preferably a safety device is provided at a corresponding trim output at the cyclic and/or collective sticks and/or pedals, e.g. a shear pin for jam protection.

Furthermore, the pilot controls (cyclic sticks, collective sticks or pedals) for pilot and copilot are preferably coupled by means of mechanical linkage between pilot and copilot for underlying pitch, roll, collective and yaw axes of the helicopter, respectively.

According to a further preferred embodiment of the invention, the first force generating device is implemented as a gradient trim actuator and/or a mechanical friction actuator, and the second force generating device is implemented as a tactile cue actuator.

The present invention further provides an aircraft with a vehicle control system comprising an inceptor that is adapted for controlling a servo-assisted control unit of the vehicle control system via a mechanical linkage. The vehicle control system further comprises an artificial force feel generating device for generation of an artificial feeling of force on the inceptor. At least one first force generating device and at least one second force generating device are mechanically connected to the inceptor. The first force generating device is provided for generating a nominal force acting in operation on the inceptor and the second force generating device is provided for generating a tactile cue force acting in operation on the inceptor. The first and second force generating devices are arranged in parallel.

The present invention further provides a method of controlling such an aircraft with a vehicle control system. The method comprises at least the step of generating in operation of the aircraft an artificial feeling of force on an inceptor of the aircraft by means of an artificial force feel generating device, in order to assist a pilot of the aircraft in "hands-on" operation of the aircraft via the generated artificial feeling of force.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
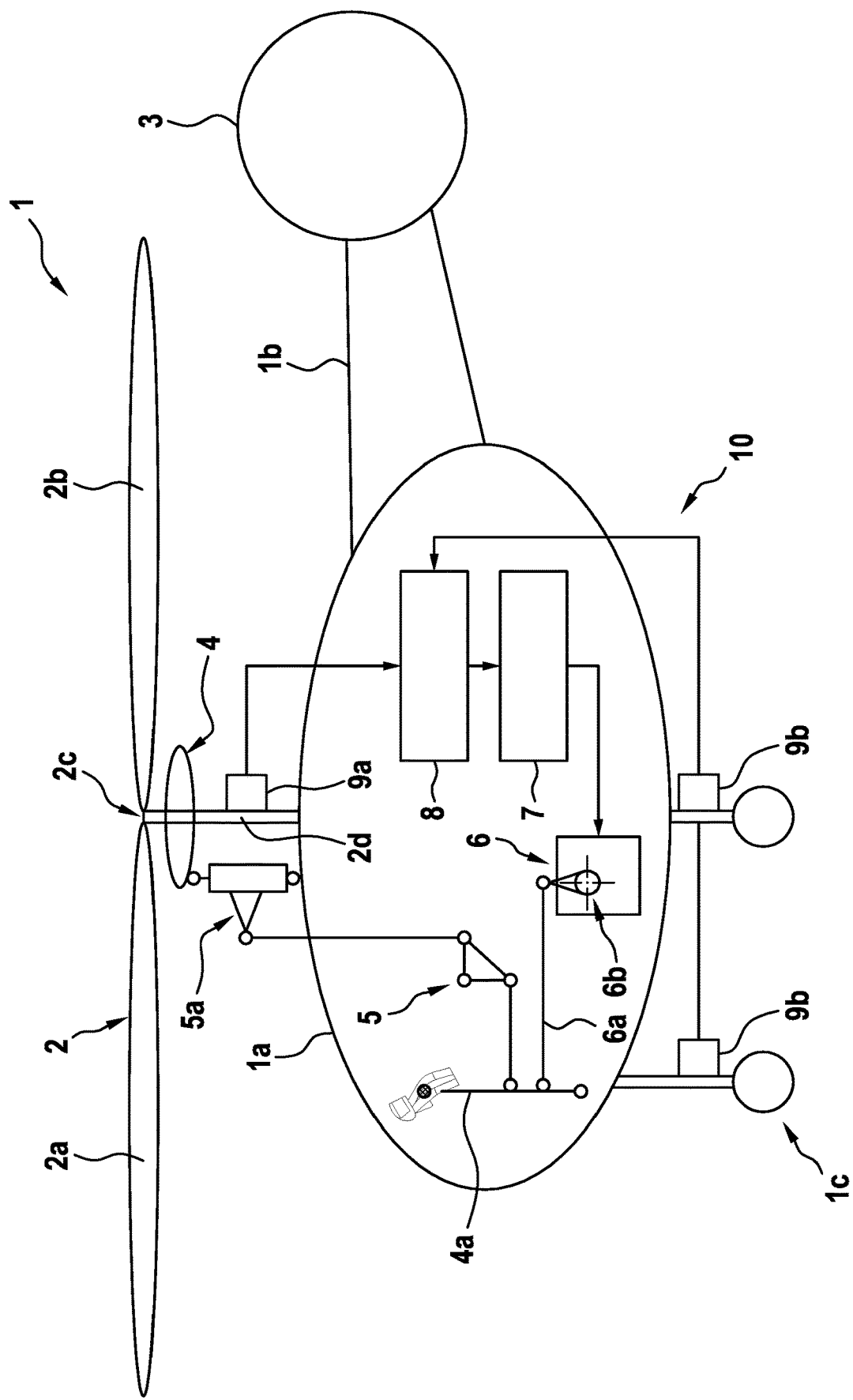
FIG. 1 shows a schematic view of a rotary wing aircraft with a control system according to a first embodiment of the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "helicopter" 1. It should, however, be noted that the present invention is not limited to helicopters and can likewise be applied to any other vehicle, in particular to a vehicle that is controllable in a flowing medium, such as air or water, independent of a particular configuration thereof.

Illustratively, the helicopter 1 comprises a fuselage 1a that is connected to a landing gear 1c, which is embodied as a wheel-type landing gear by way of example, and defines a tail boom 1b. The helicopter 1 preferably further comprises at least one main rotor 2 for providing lift and forward, backward or sideward thrust during operation. The main rotor 2 is exemplarily embodied as a multi-blade main rotor that comprises a plurality of rotor blades 2a, 2b that are mounted at an associated rotor head 2c to a rotor mast 2d, which rotates in operation of the helicopter 1 around an associated rotor axis defined by the rotor mast 2d.

By way of example, the helicopter 1 further comprises at least one preferentially shrouded counter-torque device 3 configured to provide counter-torque during operation, i.e. to counter the torque created by rotation of the at least one multi-blade main rotor 2 for purposes of balancing the helicopter 1 in terms of yaw. The at least one counter-torque device 3 is illustratively implemented by a tail rotor at an aft section of the tail boom 1b, and therefore also referred to as the "tail rotor" 3 hereinafter.

According to one aspect, the helicopter 1 comprises at least one pitch control unit 4 for controlling collective and cyclic pitch of the rotor blades 2a, 2b of the at least one multi-blade main rotor 2 in operation. This pitch control unit 4 is preferentially arranged between the rotor head 2c and the fuselage 1a of the helicopter 1 and preferably implemented by means of a swash plate assembly.

It should be noted that a suitable swash plate assembly that can be used for realizing the pitch control unit 4 and its functionality are well-known to the person skilled in the art. Therefore, a detailed description of the pitch control unit 4, i.e. the swash plat assembly, is omitted for brevity and conciseness.

Preferably, the pitch control unit 4 is servo-assisted by an associated servo drive unit 5a, such as a hydraulic power unit, which is controlled by means of an inceptor 4a via an associated mechanical linkage 5. It should be noted that for purposes of simplicity and clarity of the drawings only a single channel related to pitch control of the helicopter 1 is shown with respect to the associated servo drive unit 5a and the mechanical linkage 5. However, generally two channels are provided, i.e. the channel related to longitudinal pitch control and another channel related to roll control of the helicopter 1.

Figure 4:
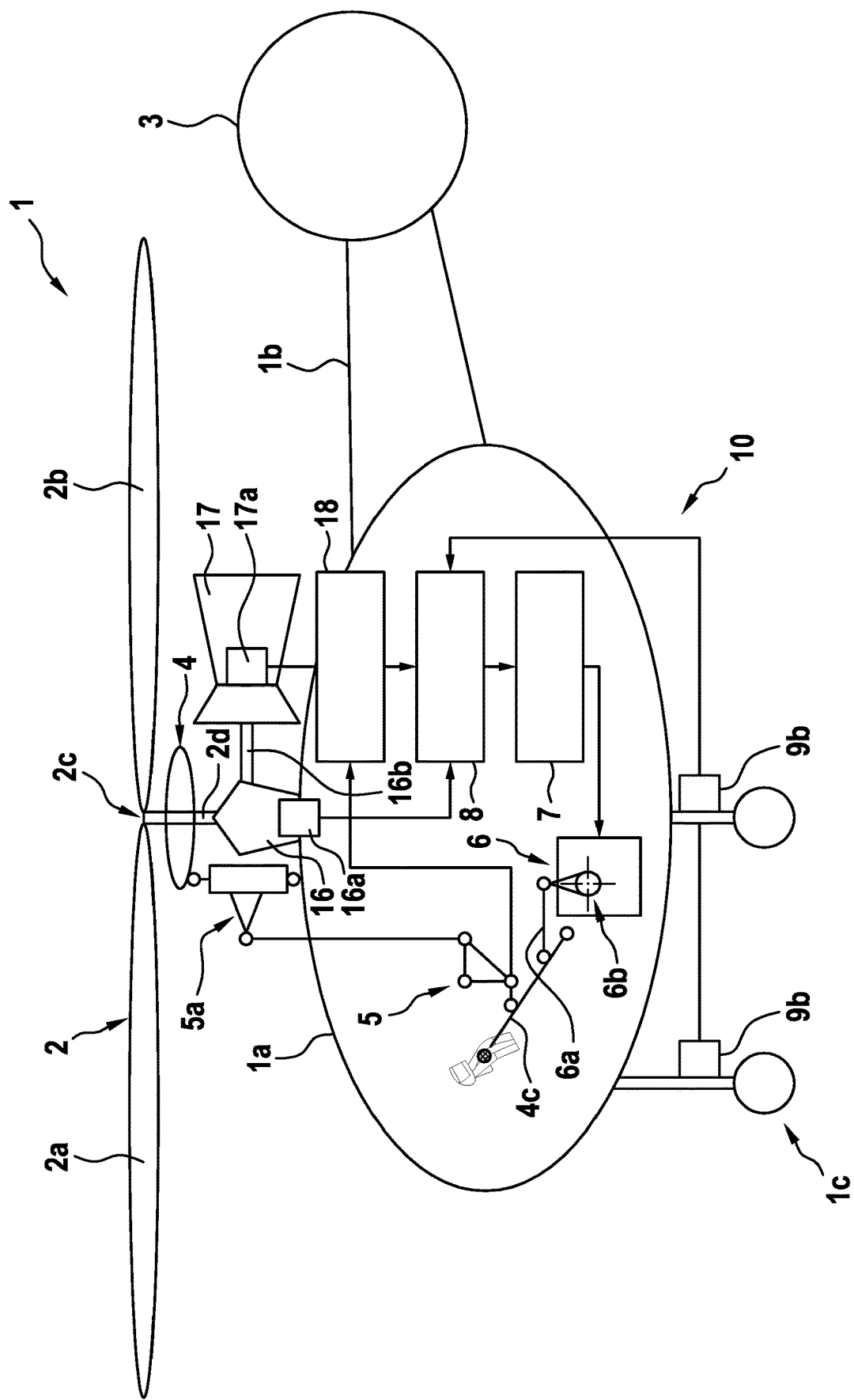
FIG. 4 shows a schematic view of a rotary wing aircraft with a control system according to a second embodiment of the present invention.

The inceptor 4a is illustratively embodied as a cyclic stick that is supposed to be provided for controlling the cyclic pitch of the rotor blades 2a, 2b only, while the collective pitch is supposed to be controlled by a separate inceptor (4c in FIG. 4). Therefore, the inceptor 4a is also referred to as the "cyclic stick" 4a hereinafter, for simplicity and clarity.

The mechanical linkage 5 comprises e.g. push/pull control rods, bellcranks, torsion shafts and/or a flexball assembly and is well-known to the person skilled in the art. Therefore, a detailed description of the mechanical linkage 5 is omitted for brevity and conciseness.

According to one aspect of the present invention, the cyclic stick 4a is connected to, and as such part of, a vehicle control system 10 that comprises an artificial force feel generating device 6 for generation of an artificial feeling of force on the cyclic stick 4a. More specifically, the latter is preferably connected via a mechanical connection 6a to an output unit 6b of the artificial force feel generating device 6, which is also part of the vehicle control system 10.

Preferably, the artificial force feel generating device 6 is controlled by an AFCS 7. More specifically, the AFCS 7 provides commands for the artificial force feel generating device 6 including a respective configuration of tactile cues that are implemented by the artificial force feel generating device 6. In cases where the artificial force feel generating device 6 is used with a vehicle other than the helicopter 1, the AFCS 7 more generally implements an automatic motion control system of that vehicle.

According to a first embodiment of the present invention, the AFCS 7 is connected to a vehicle management system 8, both of which are part of the vehicle control system 10. The vehicle management system 8 is preferably adapted for providing predictors for the limits of the performance and flight domain of the helicopter 1 as well as for providing corresponding tactile cues, and is electrically connected to one or more sensors by means of suitable interfaces, for controlling the AFCS 7 on the basis of sensor information received from these sensors in operation of the helicopter 1, or for providing the sensor information to the AFCS 7 in operation. The latter allows the AFCS 7 to control the artificial force feel generating device 6 on the basis of the provided sensor information.

Preferably, the sensors comprise at least one rotor mast bending moment sensor 9a associated with the rotor mast 2d, such as one or more strain gauges and/or optical sensors, which may be redundant in order to increase availability and reliability. The sensors illustratively further comprise at least one weight-on-wheels sensor 9b associated with the exemplary wheel-type landing gear 1c.

More specifically, sensor information provided by the at least one rotor mast bending moment sensor 9a can be analyzed by the vehicle management system 8 for implementing a required limitation of a mast bending moment occurring in operation of the helicopter 1 and an adequate limitation of cyclic control deflections in flight or centering of the cyclic stick 4a in an on-ground condition of the helicopter 1. This sensor information can further be analyzed to determine two-dimensional information indicating current pitch and roll of the helicopter 1 based on knowledge of a current rotor angular position in operation, as described below with reference to FIG. 3.

Figure 2:
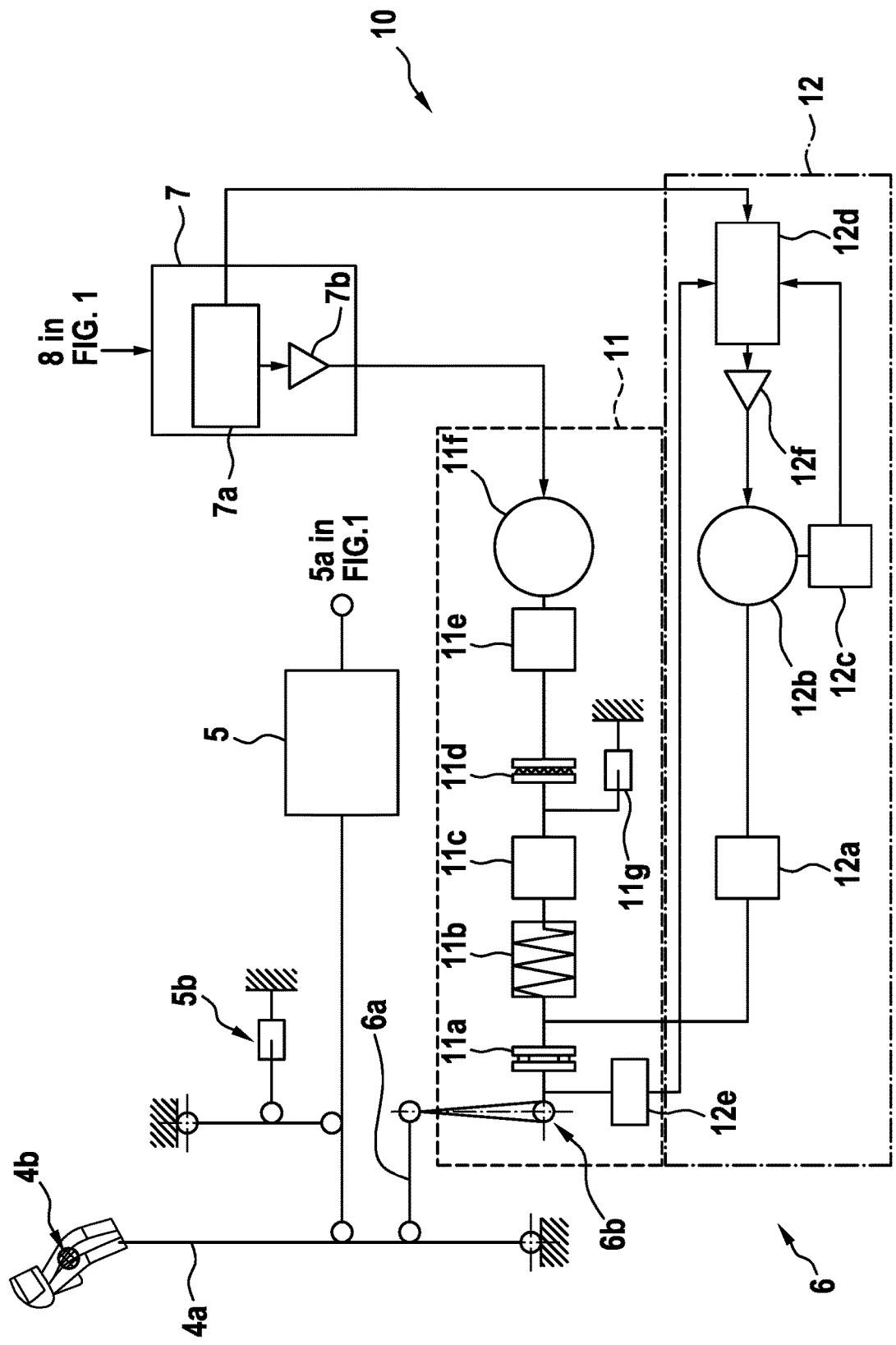
FIG. 2 shows a block diagram of the control system of FIG. 1.

FIG. 2 shows the vehicle control system 10 of FIG. 1 with the cyclic stick 4a, the mechanical linkage 5, the artificial force feel generating device 6 and the AFCS 7 for illustrating a first preferred embodiment of the artificial force feel generating device 6. By way of example, the cyclic stick 4a is provided with a pilot interface that defines a grip reference point 4b and the mechanical linkage 5 is provided with an optional friction and damping unit 5b.

According to one aspect, the artificial force feel generating device 6 comprises at least one first force generating device 11 and at least one second force generating device 12, both of which are mechanically connected to the cyclic stick 4a. The first force generating device 11 is preferably provided for generating a nominal force acting in operation on the cyclic stick 4a and the second force generating device 12 is preferably provided for generating a tactile cue force acting in operation on the cyclic stick 4a. The tactile cue force is preferentially limited for being overridable by a pilot who operates the cyclic stick 4a in operation of the helicopter 1.

According to the present invention, the first and second force generating devices 11, 12 are arranged in parallel. Preferably, the parallel first and second force generating devices 11, 12 are connected to the output unit 6b of the artificial force feel generating device 6 via a safety unit 11a that is at least provided for limiting authority of the first and second force generating devices 11, 12. In particular, internal failures or malfunctions such as jamming can preferably be prevented by means of this safety unit 11a.

Furthermore, by way of example, the output unit 6b is implemented as a rotary output unit that is connected to a position sensor 12e adapted for monitoring a rotational position of the rotary output unit 6b in operation. Therein, the safety unit 11a is preferably also provided for disconnecting the first and second force generating devices 11, 12 from the cyclic stick 4a while said position sensor 12e remains connected.

Illustratively, the safety unit 11a and the position sensor 12e are associated with the first force generating device 11. However, the position sensor 12e may likewise be associated with the second force generating device 12, as described in more detail below.

In one embodiment, the first force generating device 11 is implemented as a conventional gradient trim actuator for generating the nominal force, which is well-known to the person skilled in the art. Therefore, the first force generating device 11 is also referred to as the "gradient trim actuator" 11 hereinafter, for simplicity and clarity. Furthermore, the second force generating device 12 is implemented according to this embodiment as a tactile cue actuator for generating the tactile cue force and, consequently, hereinafter also referred to as the "tactile cue actuator" 12, for simplicity and clarity.

The nominal force preferably acts in operation on the cyclic stick 4a for moving the latter into a neutral position. This neutral position defines a trim point that determines a preferred motion direction of the helicopter 1.

Preferably, the gradient trim actuator 11 comprises at least one mechanical force generating unit 11b. The latter is preferably embodied as a spring unit that is connected to the safety unit 11a. A respective spring force provided by this spring unit 11b, which defines the nominal force provided by the gradient trim actuator 11, is preferably adjustable by means of a reversible gear unit 11c that is preferentially connected to a coupling unit 11d and, in parallel thereto, to a release damping unit 11g. The coupling unit 11d in turn is preferably connected via an irreversible gear unit 11e to an electrical motor 11f, which is preferentially embodied as a brushed DC motor and at least provided for maintaining the coupling unit 11d in operation in a coupling state. Illustratively, the safety unit 11a, the spring unit 11b, the reversible gear unit 11c, the coupling unit 11d, the irreversible gear unit 11e and the brushed DC motor 11f define the gradient trim actuator 11.

According to one aspect of the present invention, the coupling unit 11d is embodied as a trim release unit that is adapted for coupling the spring unit 11b to the cyclic stick 4a. This coupling, i.e. trim release unit 11d is preferably at least activatable by the pilot for de-coupling the spring unit 11b and, thus, the gradient trim actuator 11 from the cyclic stick 4a, while the tactile cue actuator 12 remains mechanically connected to the cyclic stick 4a.

It should be noted that, due to the irreversible gear 11e, provision of the nominal force by the spring unit 11b is maintained even if a loss of electrical power supply or of the brushed DC motor 1 if occurs in operation. Only if the trim release unit 11d is activated by the pilot for de-coupling the spring unit 11b from the cyclic stick 4a, provision of the nominal force is annulated for the convenience of the pilot.

Preferably, the brushed DC motor 11f is controlled by a control and monitoring unit 7a via power electronics 7b that include preferably at least a pulse width modulator for controlling the brushed DC motor 11f via a suitable pulse width modulated control signal. The control and monitoring unit 7a and the power electronics 7b are preferentially implemented by the AFCS 7, so that already existing components of the helicopter 1 can be used for realizing the vehicle control system 10 according to the present invention at least partly.

According to one aspect, the tactile cue actuator 12 comprises at least one electrical force generating unit 12b, which is preferably embodied as an electrical motor, in particular a brushless DC motor. This brushless DC motor 12b generates the tactile cue force that is provided by the tactile cue actuator 12 to the cyclic stick 4a, preferably by means of a reversible gear 12a.

Preferably, the brushless DC motor 12b is controlled by a control and monitoring unit 12d via power electronics 12f that include preferably at least an oscillations damping unit for damping pilot-assisted oscillations and/or pilot-induced oscillations. The power electronics 12f may further comprise a pulse width modulator for controlling the brushless DC motor 12b via a suitable pulse width modulated control signal.

According to one aspect of the present invention, the power electronics 12f generate the suitable pulse width modulated control signal in response to instructions received from the control and monitoring unit 12d, that generates these instructions on the basis of sensor information provided at least by the position sensor 12e and a motor sensor 12c that is associated with the brushless DC motor 12b.

Preferably, the motor sensor 12c provides electrical current information for torque control. Furthermore, the motor sensor 12c preferably also provides rotary position information for commutation and torque control. Moreover, the motor sensor 12c preferably also provides information about the temperature of the brushless DC motor 12b, especially corresponding motor windings.

Illustratively, the reversible gear unit 12a, the brushless DC motor 12b, the motor sensor 12c, the control and monitoring unit 12d and the power electronics 12f define the tactile cue actuator 12. As already mentioned above, the position sensor 12e can also be considered as being part of the tactile cue actuator 12, as sensor information provided by this position sensor 12e is preferably treated by the control and monitoring unit 12d of the tactile cue actuator 12.

Preferably, the control and monitoring unit 12d is further connected via a suitable bus to the control and monitoring unit 7a of the AFCS 7 and monitored and controlled by the latter. Moreover, the AFCS 7 is preferably adapted for driving the tactile cue actuator 12 on the basis of sensor information obtained at least from the sensors 9a, 9b of FIG. 1, as described above.

Figure 3:
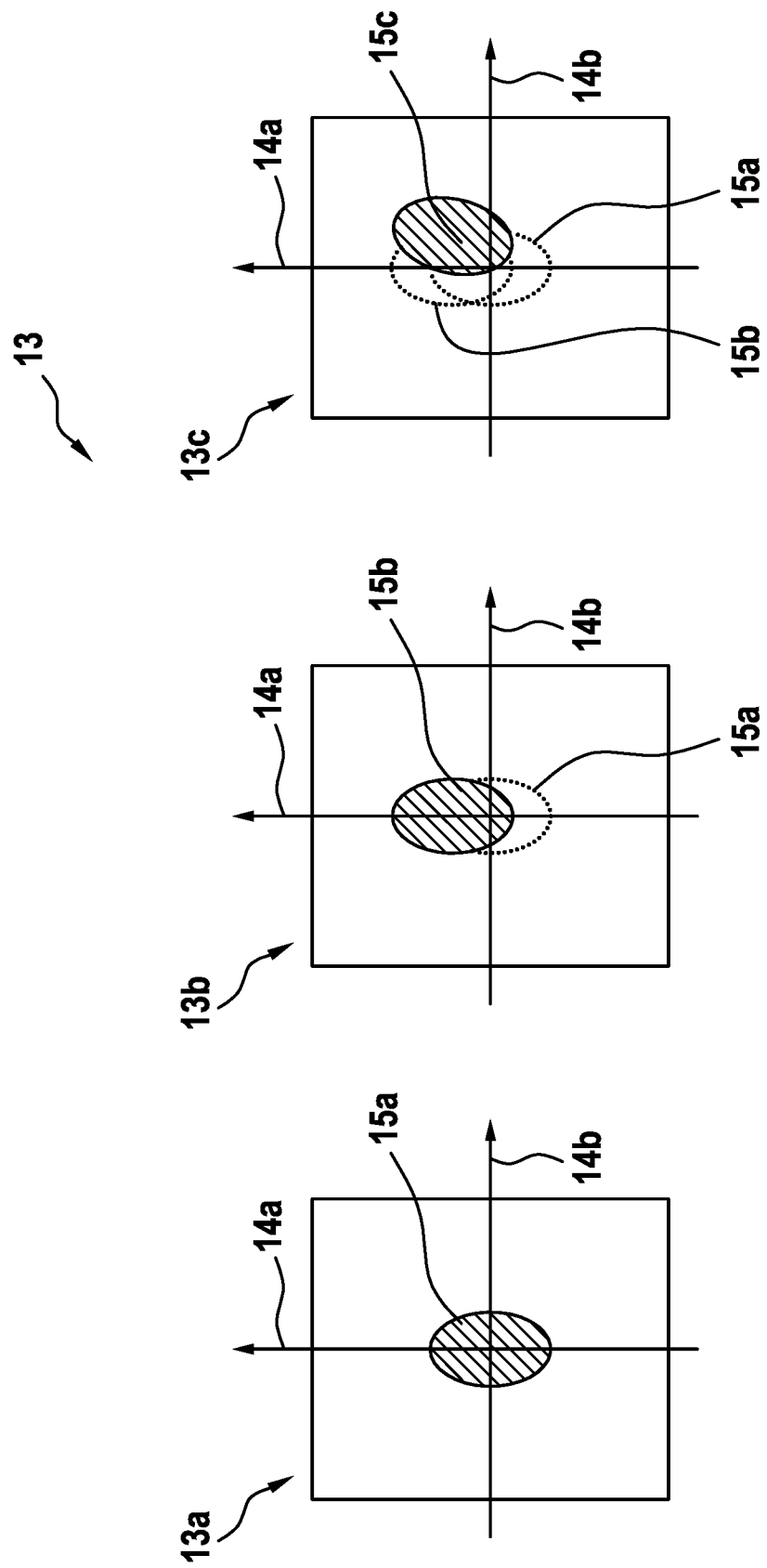
FIG. 3 shows exemplary control range indications for the rotary wing aircraft of FIG. 1.

FIG. 3 shows control range indications 13 for the rotor mast 2d of the helicopter 1 of FIG. 1 for illustrating exemplary momentary rotor mast bending moment information that can be obtained by analysing sensor information that is provided by the rotor mast bending moment sensor 9a of FIG. 1. More specifically, the control range indications 13 illustratively comprise three different diagrams 13a, 13b, 13c, each representing a particular bending moment range with respect to momentary longitudinal pitch and roll directions 14a, 14b of the rotor mast 2d of FIG. 1.

In a first diagram 13a, a limited control range indication 15a is shown. The latter is e. g. associated with an on-ground condition of the helicopter 1 of FIG. 1, where a rotor mast bending moment can be induced to the rotor mast 2d of FIG. 1 e.g. by pilot command input to the cyclic stick.

In a second diagram 13b, a limited control range indication 15b is shown. The latter occurs e.g. if the bending moment limitation of the rotor mast 2d of FIG. 1 is shifted in the longitudinal pitch direction e.g. resulting from tail or head wind during operation of the helicopter 1 of FIG. 1.

In a third diagram 13c, a limited control range indication 15c is shown. The latter occurs e.g. if the bending moment limitation of the rotor mast 2d of FIG. 1 is shifted in the longitudinal pitch and the roll directions e.g. due to cross wind influence or slope landing during operation of the helicopter 1 of FIG. 1.

FIG. 4 shows the helicopter 1 of FIG. 1 with the vehicle control system 10 having the artificial force feel generating device 6 that is controlled by the AFCS 7, which in turn is controlled by the vehicle management system 8. However, in contrast to FIG. 1 the artificial force feel generating device 6 is now exemplarily connected to an inceptor 4c, which is illustratively embodied as a collective stick that is supposed to be provided for controlling the collective pitch of the rotor blades 2a, 2b via the mechanical linkage 5, the servo drive unit 5a and the pitch control unit 4. Therefore, the inceptor 4c is also referred to as the "collective stick" 4c hereinafter, for simplicity and clarity.

Furthermore, the helicopter 1 is now shown having a main gearbox 16 for driving the main rotor 2 and at least one main engine 17 for driving the main gearbox 16 via a main gearbox input shaft 16b. It should be noted that the collective stick 4c, the main gearbox 16 and the at least one main engine 17 are not shown in the helicopter 1 in FIG. 1, as they are not required for illustration and understanding of the functionality of the vehicle control system 10 according to FIG. 1. However, it is clear that the helicopter 1 of FIG. 1 preferably likewise comprises these elements and that the vehicle control systems 10 according to FIG. 1 and FIG. 4 are preferably combined into one common vehicle control system 10.

According to one aspect, the main gearbox 16 is provided with at least one torque sensor 16a, which is configured for providing sensor information related to generated torque of the main gearbox 16 in operation to the vehicle management system 8. The latter is preferably controlled by a full authority digital engine control 18, which is illustratively connected to the collective stick 4c. Furthermore, the at least one main engine 17 is preferably provided with at least one speed and/or temperature sensor 17a, which is configured to provide sensor information related to speed and/or temperature of the at least one main engine 17 in operation to the full authority digital engine control 18.

In addition, the full authority digital engine control 18 is provided with information about the position of the inceptor 4c and associated mechanical linkage 5 in order to provide engine thrust matching power needs for a respectively associated collective blade angle.

Accordingly, the vehicle control system 10 is adapted to provide a first limit indication to allow for an efficient mechanical and/or thermal engine and gearbox protection in operation of the helicopter 1 based on the sensor information of the sensors 16a, 17a. This first limit indication is preferably provided to the pilot via the artificial force feel generating device 6. Furthermore, this sensor information can be used to implement an effective lock-down of the collective stick 4c in the on-ground condition of the helicopter 1 during engine start-up of the at least one main engine 17 by means of the artificial force feel generating device 6.

Figure 5:
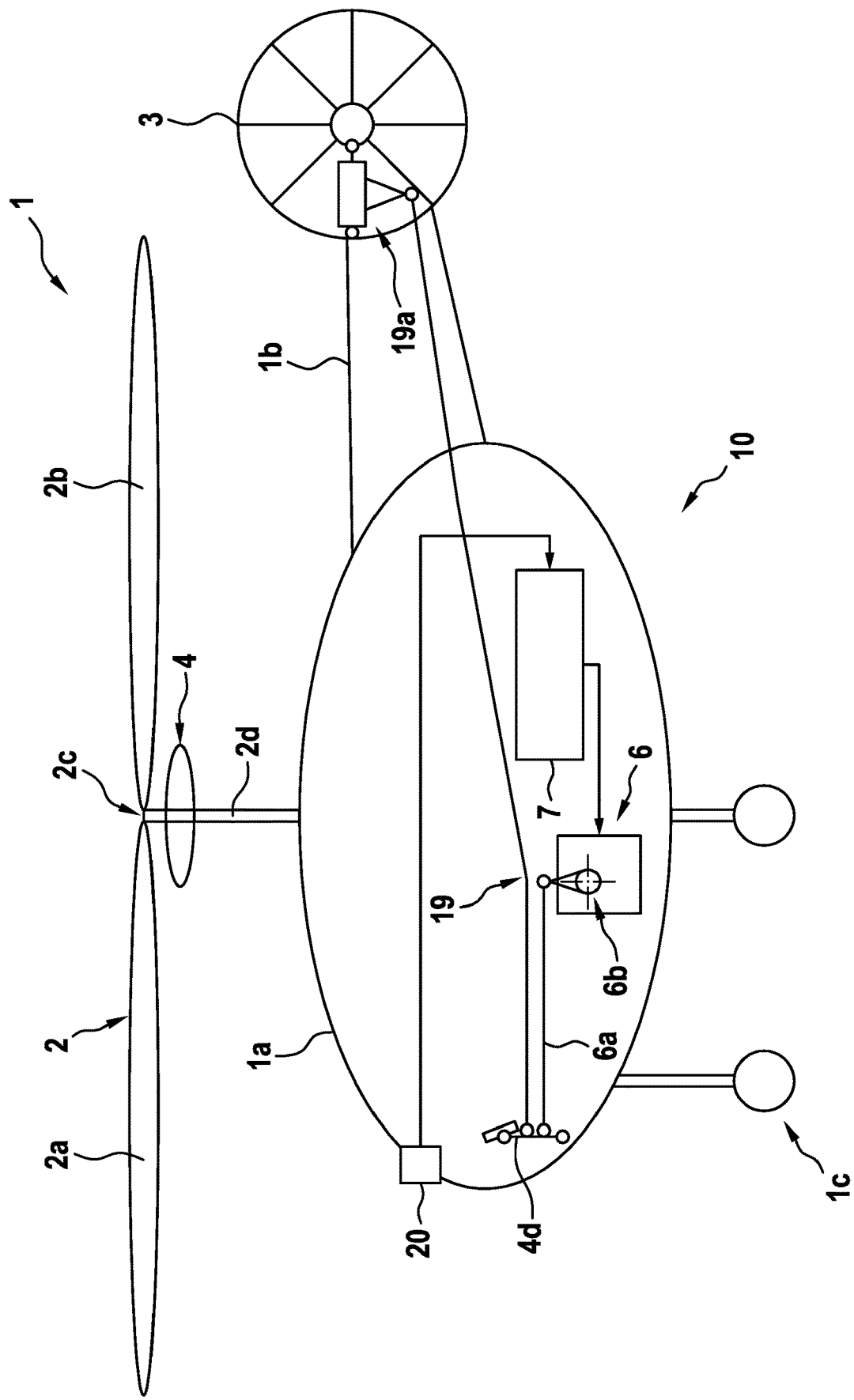
FIG. 5 shows a schematic view of a rotary wing aircraft with a control system according to a third embodiment of the present invention.

FIG. 5 shows the helicopter 1 of FIG. 1 with the vehicle control system 10 having the artificial force feel generating device 6 that is controlled by the AFCS 7. However, in contrast to FIG. 1 the artificial force feel generating device 6 is now exemplarily connected to an inceptor 4d, which is illustratively embodied as pedals that are supposed to be provided for controlling the tail rotor 3 via a mechanical linkage 19 and a servo drive unit 19a, such as a hydraulic power unit, for controlling the yaw of the helicopter 1. Therefore, the inceptor 4d is also referred to as the "yaw pedals" 4d hereinafter, for simplicity and clarity.

The tail rotor 3 is e.g. driven by a suitable output shaft of the main gearbox 16 of FIG. 4. The mechanical linkage 19 comprises e.g. push/pull control rods, bellcranks, torsion shafts and/or a flexball assembly and is well-known to the person skilled in the art. Therefore, a detailed description of the mechanical linkage 19 is omitted for brevity and conciseness.

Furthermore, the helicopter 1 is now shown having at least one air speed, air density and/or outside air temperature sensor 20, which is configured for providing sensor information related to air speed, air density and/or outside air temperature in operation to the AFCS 7. Thus, the AFCS 7 can control the artificial force feel generating device 6 on the basis of the provided sensor information for implementing a variable pilot control authority and pilot control rate of the tail rotor 3 based on the air speed, the air density and/or the outside air temperature in operation.

It should be noted that the yaw pedals 4d, the mechanical linkage 19 and the servo drive unit 19a are not shown in the helicopter 1 in FIG. 1, as they are not required for illustration and understanding of the functionality of the vehicle control system 10 according to FIG. 1. However, it is clear that the helicopter 1 of FIG. 1 likewise comprises these elements and that the vehicle control systems 10 according to FIG. 1 and FIG. 5 are preferably combined into one common vehicle control system 10. Furthermore, in a preferred implementation of the present invention, the helicopter 1 comprises all features and characteristics described with reference to FIG. 1, FIG. 4 and FIG. 5.

Figure 6:
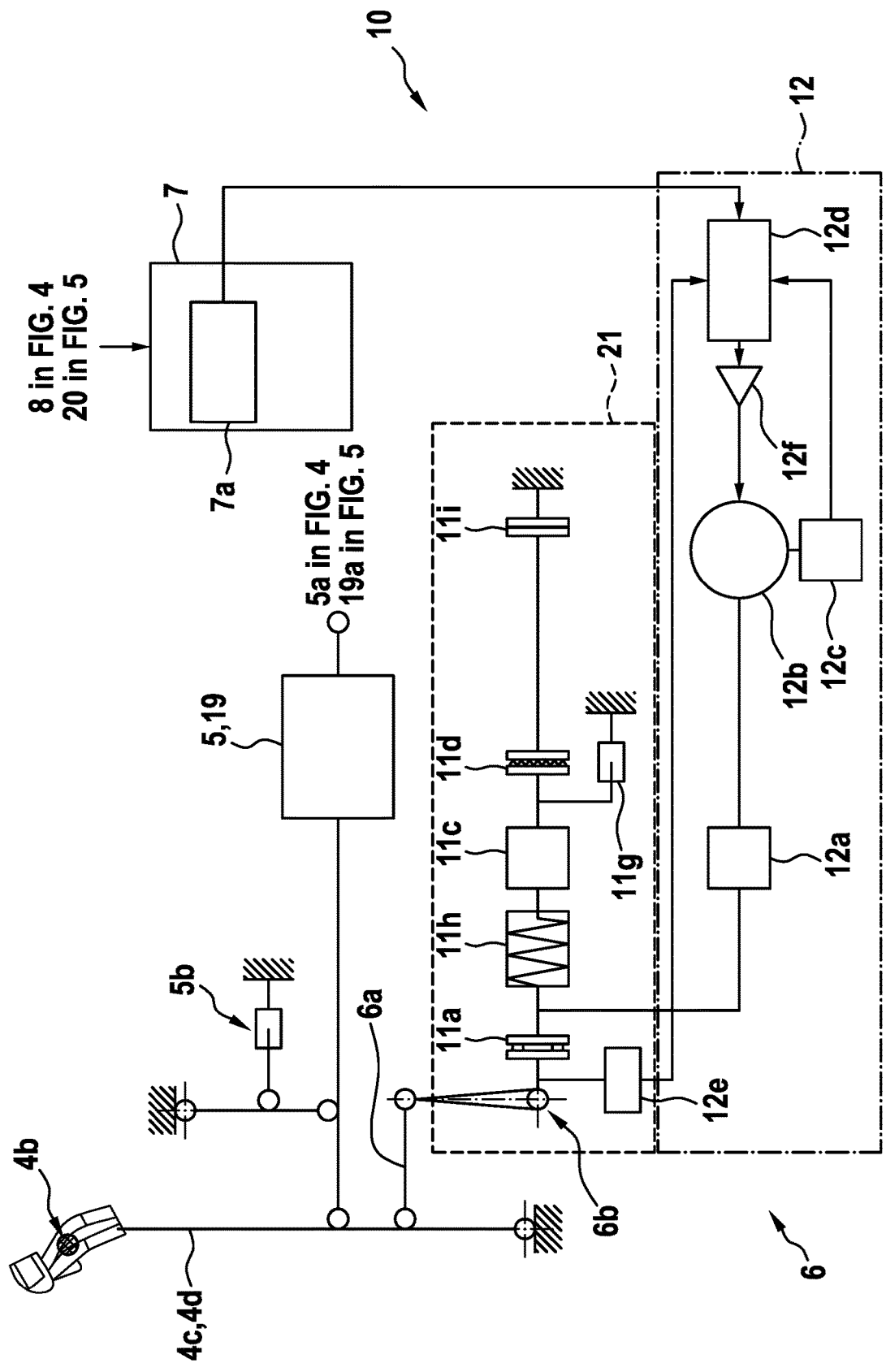
FIG. 6 shows a block diagram of the control system of FIG. 4 and FIG. 5.

FIG. 6 shows the vehicle control system 10 of FIG. 4 and/or FIG. 5 with the collective stick 4c and/or the yaw pedals 4d, the mechanical linkages 5 and/or 19, the artificial force feel generating device 6 and the AFCS 7 for illustrating a second preferred embodiment of the artificial force feel generating device 6. It should be noted that the vehicle control system 10 according to the second embodiment of FIG. 6 mainly corresponds to the vehicle control system 10 according to the first embodiment of FIG. 2, so that in the following only differences between both embodiments are described in greater detail.

More specifically, in contrast to the first embodiment, the artificial force feel generating device 6 of the vehicle control system 10 according to the second embodiment comprises a friction unit 21 that is preferably embodied in the form of a conventional mechanical friction actuator for generating the nominal force, which is well-known to the person skilled in the art and, hereinafter also referred to as the "mechanical friction actuator" 21, for simplicity and clarity.

The mechanical friction actuator 21 now implements the first force generating device instead of the gradient trim actuator 11 of FIG. 2. The mechanical friction actuator 21 is, however, not controlled by the AFCS 7, so that the latter does not require the power electronics 7b of FIG. 2 for control thereof.

According to one aspect, the mechanical friction actuator 21 comprises an inceptor movement detector 11h, which is connected to the safety unit 11a and the reversible gear unit 11c, instead of the spring unit 11b of FIG. 2. The inceptor movement detector 11h is adapted for supporting the nominal force in response to a detection of movement of the collective stick 4c and/or the yaw pedals 4d and providing corresponding "hands-on/-off" information to the AFCS 7. The nominal force as such is provided by a friction unit 11i, which is e.g. arranged between a fixed point in the helicopter 1 of FIG. 4 and/or FIG. 5 and the trim release unit 11d, in order to be releasable.

Figure 7:
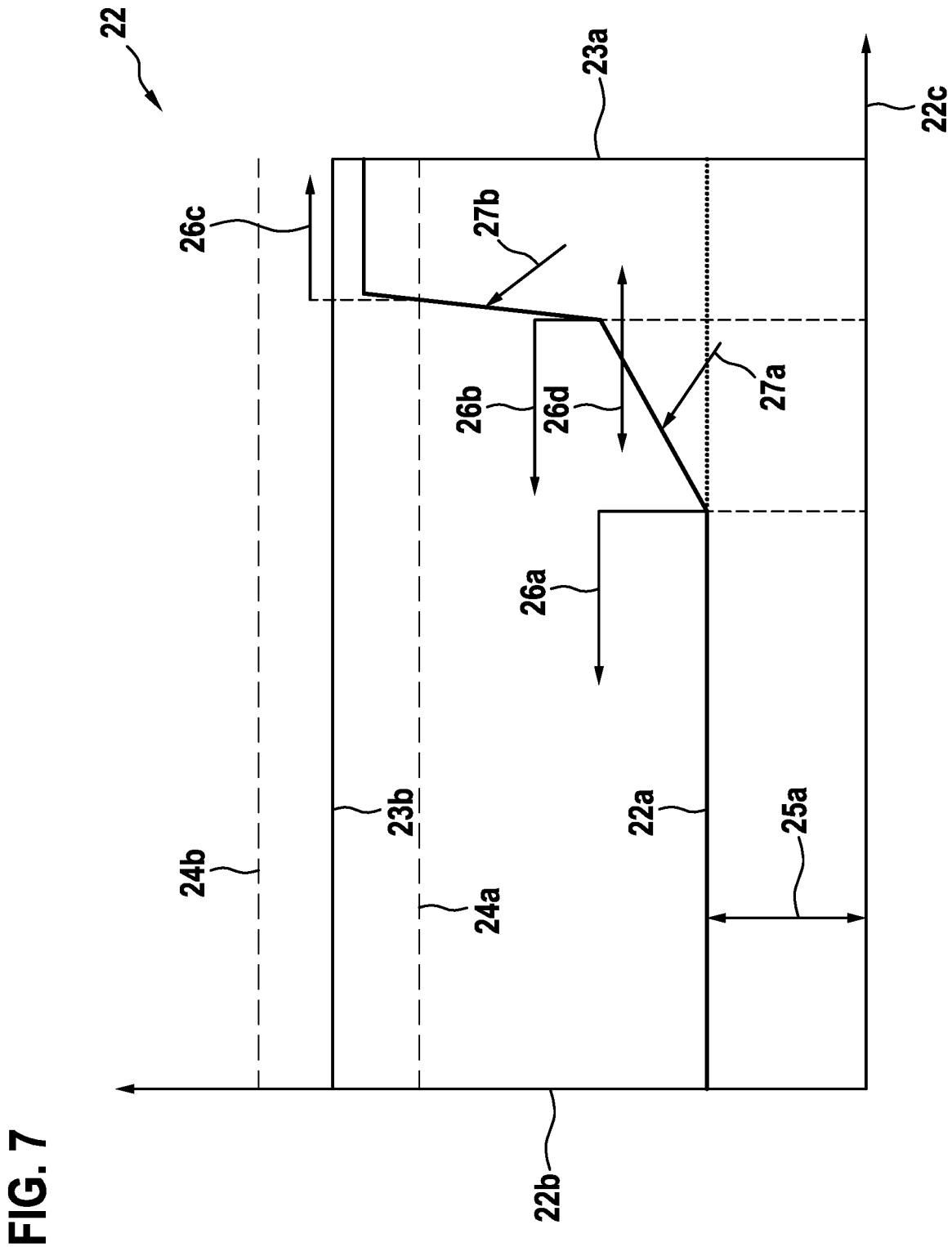
FIG. 7 shows an exemplary inceptor deflection-torque diagram in operation of an inventive control system, with absolute torque indication for the second and third embodiment.
Figure 10:
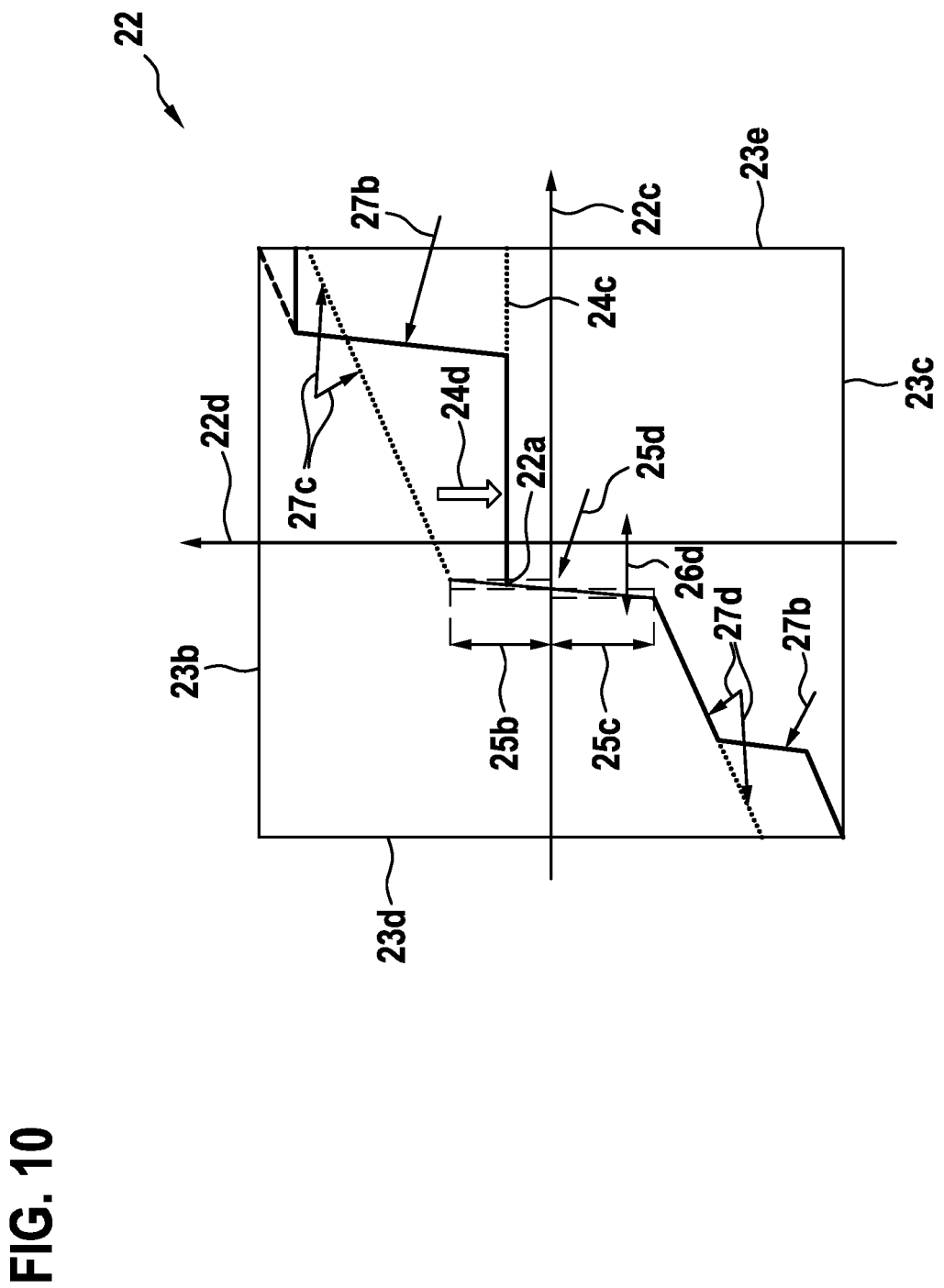
FIG. 10 shows an exemplary inceptor deflection-torque diagram in operation of an inventive control system, with non-absolute torque indication for the first embodiment.

FIG. 7 shows an inceptor-deflection torque diagram 22 that exemplifies deflection-torque characteristics 22a of the cyclic stick 4a of FIG. 2, the collective stick 4c of FIG. 6 or the yaw pedals 4d of FIG. 6 in operation, for illustrating a preferred functioning or operating method of the helicopter 1 of FIG. 1, FIG. 4 and/or FIG. 5. However, it should be noted that preferred, more precise gradient characteristics of the cyclic stick 4a of FIG. 2 and corresponding tactile cues are depicted in FIG. 10.

More specifically, the deflection-torque characteristics 22a illustrate an absolute torque 22b of the cyclic stick 4a of FIG. 2, the collective stick 4c of FIG. 6 or the yaw pedals 4d of FIG. 6 in operation dependent on a respective, momentary deflection 22c thereof. Furthermore, the deflection-torque characteristics 22a are shown in the context of a maximum deflection 23a and a maximum torque 23b that can be induced into the cyclic stick 4a of FIG. 2, the collective stick 4c of FIG. 6 or the yaw pedals 4d of FIG. 6 in operation by the tactile cue actuator 12 of FIG. 2 or FIG. 6.

According to one aspect, the maximum torque 23b that can be induced by the tactile cue actuator 12 of FIG. 2 or FIG. 6 is higher than a minimum pilot override force 24a. Thus, at least in a predefined functioning domain, as described below, the pilot must apply an overriding force that is greater than the minimum pilot override force 24a for deflecting the cyclic stick 4a of FIG. 2, the collective stick 4c of FIG. 6 or the yaw pedals 4d of FIG. 6, so that undesirable, disadvantageous and/or dangerous flight and/or operating states can be prevented. Furthermore, the maximum torque 23b that can be induced by the tactile cue actuator 12 of FIG. 2 or FIG. 6 is preferably smaller than a maximum pilot override force 24b, so that the pilot can always override the tactile cue force provided by the tactile cue actuator 12 of FIG. 2 or FIG. 6, even in the case of malfunction of electrical power supply, control or corresponding electrical motors, as described above.

More specifically, the deflection-torque characteristics 22a illustrate that a nominal breakout torque 25a is induced to the cyclic stick 4a of FIG. 2, the collective stick 4c of FIG. 6 or the yaw pedals 4d of FIG. 6 in operation by means of the gradient trim actuator 11 of FIG. 2 or the mechanical friction actuator 21 of FIG. 6 in a predefined normal continuous function domain 26a. In this domain 26a, pilot control forces much smaller than the minimum pilot override force 24a are sufficient for deflecting the cyclic stick 4a of FIG. 2, the collective stick 4c of FIG. 6 or the yaw pedals 4d of FIG. 6.

Above this normal continuous function domain 26a, i.e. above a first predefined deflection threshold value, a backdriving gradient ramp 27a is applied to the cyclic stick 4a of FIG. 2, the collective stick 4c of FIG. 6 or the yaw pedals 4d of FIG. 6 until a second predefined deflection threshold value is reached, which delimits a time limited function domain 26b, wherein the tactile cue force provided by the tactile cue actuator 12 of FIG. 2 or FIG. 6 is only increased smoothly. In other words, as long as the induced tactile cue force, i.e. the induced absolute torque 22b, increases only smoothly, this stipulates to the pilot a normal functioning mode without undesirable, disadvantageous and/or dangerous flight and/or operating states, while still allowing a comparatively easy overriding.

Above the time limited function domain 26b, a soft stop ramp 27b is generated such that starting from the second predefined deflection threshold value the induced tactile cue force, i.e. the induced absolute torque 22b increases abruptly, thereby stipulating to the pilot an approaching exiting of the normal functioning mode and an imminent entering of undesirable, disadvantageous and/or dangerous flight and/or operating states. However, overriding is still possible up to a certain extent with less force than the minimum pilot override force 24a, but the soft stop ramp 27b is preferably embodied such that the pilot feels a clear difference to the backdriving gradient ramp 27a, which should be perceived as a clear warning for stopping deflection of the cyclic stick 4a of FIG. 2, the collective stick 4c of FIG. 6 or the yaw pedals 4d of FIG. 6. According to one aspect, the steepness and length of the backdriving gradient ramp 27a and the soft stop ramp 27b are adjustable.

Preferably, the soft stop ramp 27b is generated such that starting with a predefined third threshold value, an override function domain 26c is reached. Therein, the pilot preferably needs to apply more force than the minimum pilot override force 24a for overriding the induced tactile cue force of the tactile cue actuator 12 of FIG. 2 or FIG. 6. Consequently, the override function domain 26c is configured to stipulate to the pilot that undesirable, disadvantageous and/or dangerous flight and/or operating states have probably already been reached.

Figure 8:
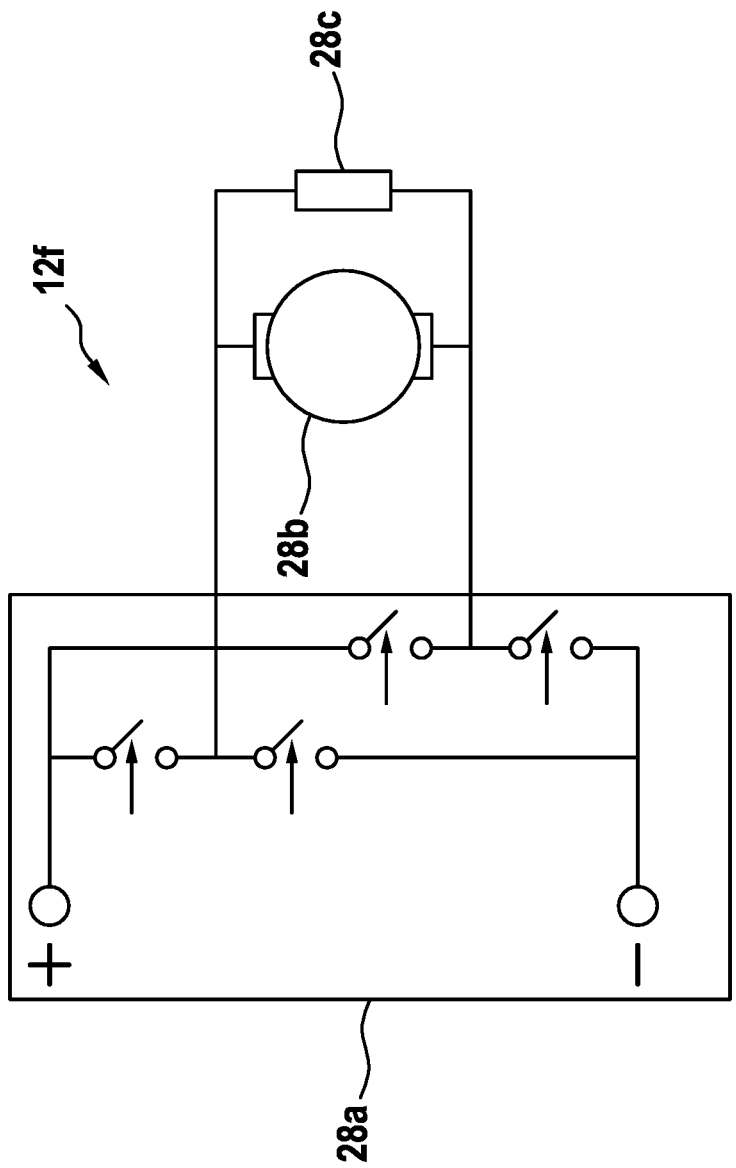
FIG. 8 shows a schematic view of tactile cue actuator power electronics according to the present invention.

FIG. 8 shows the power electronics 12f according to one aspect of the present invention, which illustratively comprise power control electronics 28a, a motor/generator 28b that is preferably embodied as brushless DC motor/generator and preferentially corresponds to the motor 12b of FIG. 2 and FIG. 6, and at least one backup damping resistor 28c.

Preferably, the power electronics 12f will control the motor/generator 28b and provide different levels of force and resistance to the pilot depending on the domain 26a, 26b and 26c of FIG. 7.

Generally, the motor/generator 28b and the tactile cue actuator 12 of FIG. 2 and FIG. 6 shall not provide significant resistance while in the normal continuous function domain 26a of FIG. 7 or if the motor/generator 28b is mechanically working but not supplied with electrical power. However, in a preferred embodiment the power electronics 12f are at least adapted for providing a minimum level of backup damping in order to suppress pilot-induced/pilot-assisted oscillations by means of a well-defined short circuit of back-driven motor/generator 28b. Therein, the resistance force is adapted by the accordingly selected resistor 28c. Thus, a respective backup damping force feel provided by the power electronics 12f can be felt by the pilot.

Furthermore, an optional additional switch can be provided between the motor/generator 28b and the resistor 28c. This optional additional switch is, however, not shown in FIG. 8 for simplicity and clarity of the drawing. Nevertheless, the optional additional switch is preferably controlled and can be closed by the control/monitoring unit 12d of FIG. 2 and FIG. 6, so that passive damping can be created in order to suppress excessive transients of pilot control inputs in case of detected failure or loss of power supply of the control electronics 28a.

It should be noted that in a preferred embodiment, the motor 12b and the power electronics 12f of FIG. 2 and FIG. 6 are equivalent to the control electronics 28a, the motor/generator 28b and the resistor 28c. More specifically, the control electronics 28a are preferably part of the power electronics 12f and the resistor 28c would preferentially either be integrated into the power electronics 12f, or into the motor 12b.

Figure 9:
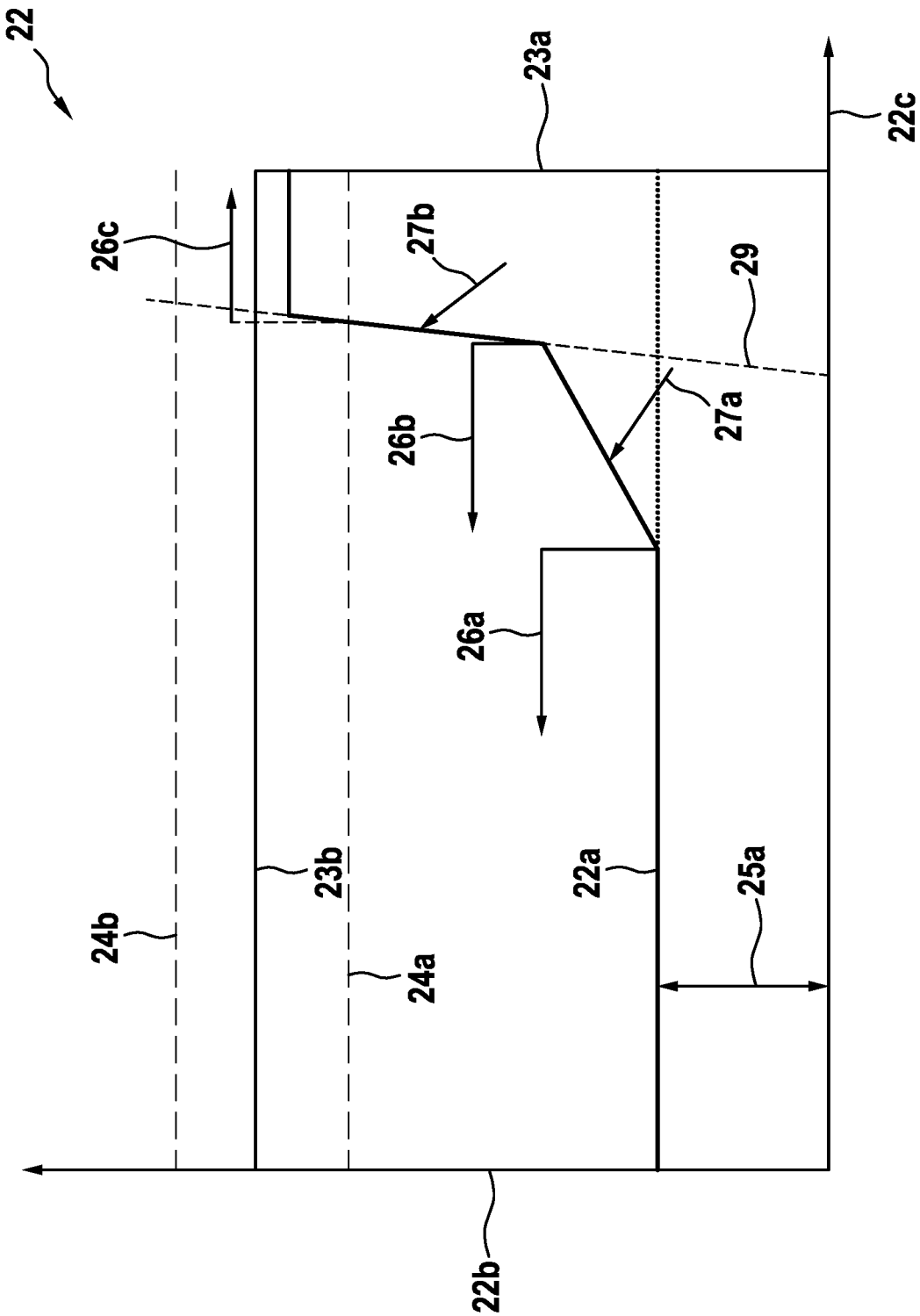
FIG. 9 shows an alternative inceptor deflection-torque diagram in operation of an inventive control system, with absolute torque indication for the second and third embodiment.

FIG. 9 shows the inceptor-deflection torque diagram 22 of FIG. 7 that exemplifies the deflection-torque characteristics 22a of the cyclic stick 4a of FIG. 2, the collective stick 4c of FIG. 6 or the yaw pedals 4d of FIG. 6 in operation. In contrast to FIG. 7, the inceptor-deflection torque diagram 22 illustratively further comprises an associated stiffness slope 29.

By setting the stiffness slope 29 appropriately, oscillations of the cyclic stick 4a of FIG. 2, the collective stick 4c of FIG. 6 or the yaw pedals 4d of FIG. 6 in operation in the vicinity of soft stops indicated by the soft stop ramp 27b can be avoided. More specifically, feed-forward spring-damper characteristics of the soft stops can be obtained, wherein the brushless DC motor 12b of the tactile cue actuator 12 of FIG. 2 or FIG. 6 creates a steep force-position gradient that interacts with a given inertia of the mechanical linkage 5 of FIG. 2 or the mechanical linkage 19 of FIG. 6, for providing a comparatively strong viscous damping in order to guarantee super-critical damping and, accordingly, to avoid pilot-induced or pilot-assisted oscillations. Therein, an underlying control loop of motor current of the brushless DC motor 12b of the tactile cue actuator 12 of FIG. 2 or FIG. 6 represents a function of position for definition of the steep force-position gradient, which is equivalent to an underlying stiffness of a given spring.

FIG. 10 shows the inceptor-deflection torque diagram 22 of FIG. 7 that exemplifies the deflection-torque characteristics 22a of the cyclic stick 4a of FIG. 2 in operation. However, it should be noted that in contrast to FIG. 7 the inceptor-deflection torque diagram 22 is now focused on spring gradient characteristics of the cyclic stick 4a of FIG. 2.

More specifically, the inceptor-deflection torque diagram 22 illustrates a torque 22d of the cyclic stick 4a of FIG. 2 in operation, which is comprised between a maximum negative torque 23c and a maximum positive torque 23b instead of the absolute torque 22b of FIG. 7. Furthermore, maximum and minimum possible strokes 23e and 23d of the cyclic stick 4a of FIG. 2 are illustrated, which delimit movement of the latter.

More specifically, the inceptor-deflection torque diagram 22 now illustrates an anchoring position 25d of the cyclic stick 4a of FIG. 2 where zero force is acting thereon. Starting from this anchoring position 25d, which is adjustable as indicated by an arrow 26d, a positive or negative breakout torque 25b, 25c must be applied to the cyclic stick 4a of FIG. 2 for moving the latter away from the anchoring position 25d, i.e. for deflecting them. By adjusting the anchoring position 25d as indicated with the arrow 26d, a respective artificial force feel domain and corresponding trim position can be adjusted.

According to one aspect, a nominal positive or negative force gradient 27c, 27d is generated by the gradient trim actuator 11 of FIG. 2. Illustratively, the deflection-torque characteristics 22a is shown having a minimum friction 24c, e.g. provided by the bearings of the mechanical linkage 5, 19 described above, to which the nominal positive or negative force gradient 27c, 27d is added as a result of the spring 11b of FIG. 2. Consequently, by releasing the nominal force by means of the trim release unit 11d of FIG. 2 as indicated with an arrow 24d, the artificial force feel is reduced to a feeling of the minimum friction 24c. The latter is at least essentially provided by an underlying kinematics setup of the mechanical linkage 5 of FIG. 2.

It should be noted that FIG. 10 refers to the configuration of FIG. 2, where the mechanical gradient actuator 21 is used for generating the nominal force. However, the following explanations apply likewise to the case, where the friction trim actuator 11 of FIG. 6 is used for generating the nominal force.

As can be seen from the deflection-torque characteristics 22a according to FIG. 10, the artificial force feel, i.e. the soft stop ramps 27b are super-imposed on the nominal force gradients 27c, 27d. These soft stop ramps 27b, i.e. corresponding soft stops defined therewith, are preserved in the case of a trim release of the nominal force by means of the trim release unit 11d of FIG. 6.

However, according to one aspect the artificial force feel such as e.g. the soft stops provided by the soft stop ramps 27b can be annulated by means of the safety unit 11a of FIG. 2 or FIG. 6, in cases where the latter is activated. This would again result in releasing of the nominal force such that the artificial force feel is reduced to a feeling of the minimum friction 24c.

Figure 11:
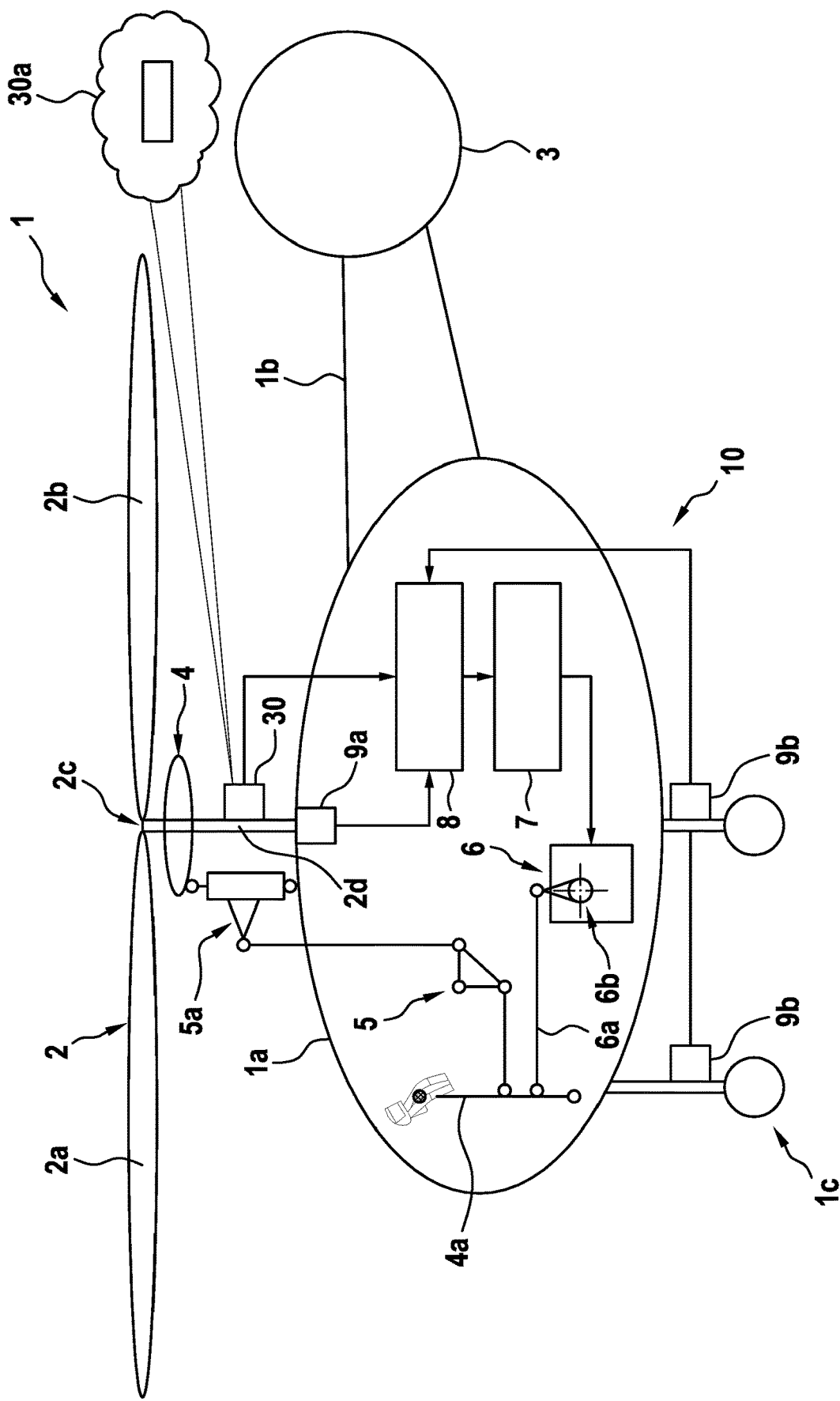
FIG. 11 shows a schematic view of a rotary wing aircraft with a control system according to a first embodiment of the present invention.

FIG. 11 shows the helicopter 1 of FIG. 1 with the main rotor 2 and the vehicle control system 10 having the cyclic stick 4a connected to the artificial force feel generating device 6 that is controlled by the AFCS 7, which in turn is controlled by the vehicle management system 8. However, in contrast to FIG. 1 the helicopter 1 is now shown having at least one obstacle detecting rotor strike alerting sensor 30. The latter is preferably connected to the vehicle management system 8 and configured for providing sensor information related to potentially striking objects 30a in operation. Thus, the vehicle management system 8 can control the artificial force feel generating device 6 via the AFCS 7 on the basis of the provided sensor information for generating the tactile cue force such that the pilot is preferentially prevented from performing control inputs on the cyclic stick 4a which would direct the helicopter 1 towards the potentially striking objects 30a. Accordingly, collision of the main rotor 2, or the helicopter 1 as such, with the potentially striking objects 30a can be prevented, thereby significantly reducing any risk of damaging the helicopter 1 due to the potentially striking objects 30a.

Furthermore, in a similar way to the tactile cueing system coupled with a rotor strike alerting sensor 30, as depicted in FIG. 11, the helicopter 1 of FIGS. 1, 4 and 5 can be equipped with a sensor system in order to determine the distance between the helicopter 1 and terrain, man-made obstacles, and other moving air traffic. It is clear that the helicopter 1 preferably likewise comprises these elements and that the vehicle control systems 10 according to FIGS. 1, 4 and 5 are preferably combined into one common vehicle control system 10.

In a preferred embodiment a radar altimeter is used for determining the vertical altitude between the helicopter 1 and terrain in order to prevent controlled flight into terrain by the pilot by means of tactile cues according to FIGS. 7, 9 and 10.

In a preferred embodiment, a barometric altimeter and position information based on GPS in combination with a database of terrain height and fixed obstacle is used in order to prevent controlled flight into terrain by the pilot by means of tactile cues according to FIGS. 7, 9 and 10.

In a preferred embodiment, the vehicle control system 10 is used to follow a preferred flight path or stay within so-called "tunnel in the sky", and prevent the pilot from deviating from the preferred flight path or exiting the "tunnel in the sky" when piloting in "hands-on" mode.

In a preferred embodiment the preferred flight path or "tunnel in the sky" includes information with respect to desirable routing, boundaries of the helicopter flight domain and engine performance limitations, loads limitation, terrain, man-made obstacles and moving air traffic.

In a preferred embodiment, the preferred flight path or "tunnel in the sky" maximizes passenger comfort by limiting helicopter bank angle (roll attitude) as well as normal accelerations.

In a preferred embodiment, the vehicle control system 10 is configured to assist the pilot by means of the artificial force feel generating device 6 to limit the flight domain in order to avoid dangerous flight conditions. More specifically, the AFCS 7 is configured to protect the helicopter 1 from excessive sink rate leading to so-called vortex ring state.

In a preferred embodiment, the vehicle control system 10 is configured to assist the pilot by means of the artificial force feel generating device 6 in case of emergency situations. By this means, pilot workload is reduced and the risk of pilot errors is minimized by supporting the pilot to stay within certain limits of the preferred flight path or stay within the specific "tunnel in the sky" for this specific emergency situation in order to avoid damage to the helicopter 1 or its occupants.

More specifically, in case of loss of one single engine (OH=one engine inoperative), the vehicle control system 10 is preferably configured to assist the pilot by means of the artificial force feel generating device 6 to stabilize the speed of rotation of the rotor 2 and limit the loss of altitude during the transition phase.

Furthermore, in case of total loss of both engines and associated autorotation landing, the vehicle control system 10 is preferably configured to assist the pilot by means of the artificial force feel generating device 6 to execute the autorotation landing. More specifically, during the initiation phase of autorotation to stabilize the speed of rotation of the rotor 2, during descent phase stay within the optimum range of performance and during flare optimize touchdown and avoid a crash/hard landing with associated damage of the helicopter 1.

Figure 12:
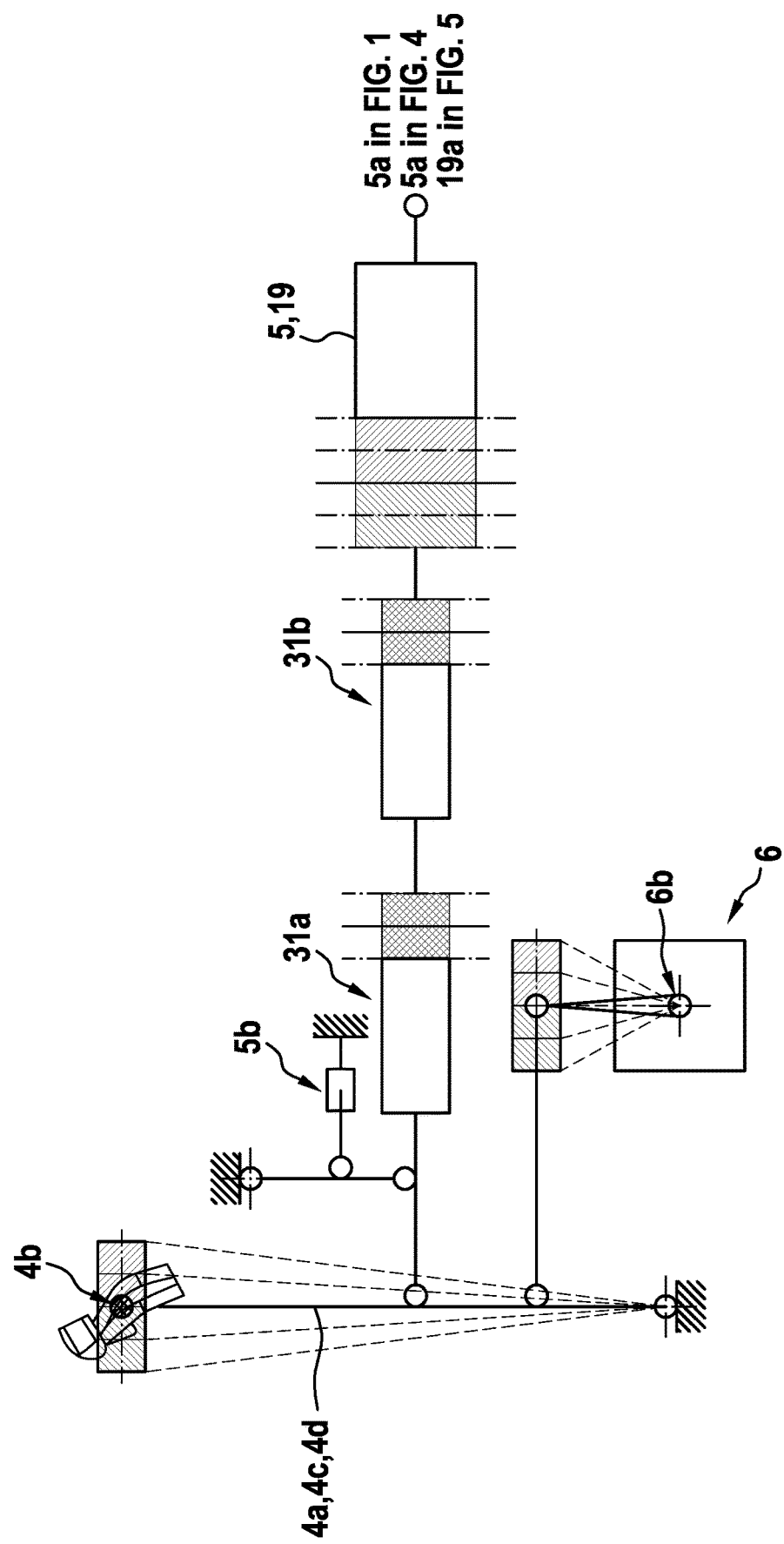
FIG. 12 shows a smart electro-mechanical actuator arrangement according to the present invention.

FIG. 12 shows one embodiment of the vehicle control system 10 of FIG. 1, FIG. 4 and/or FIG. 5, wherein the mechanical linkages 5 and/or 19 comprise at least one and illustratively two smart electro-mechanical series actuators 31a, 31b. In this configuration, the artificial force feel generating device 6 and, preferably, its tactile cue actuator 12 of FIG. 2 or FIG. 6, are preferentially configured for a compensation of any failure of the smart electro-mechanical series actuators 31a, 31b on the corresponding axis in operation for stabilization of the helicopter. This compensation should preferably further be performed in a so-called hands-off mode of the cyclic stick 4a of FIG. 2, the collective stick 4c of FIG. 6 or the yaw pedals 4d of FIG. 6, preferentially with high bandwidth and full authority during manned operation of the helicopter, or also in an optionally piloted vehicle during unmanned operation for full authority flight controls of the helicopter.

During normal operation of the smart electro-mechanical series actuators 31a, 31b stabilization takes place with the cyclic stick 4a of FIG. 2, the collective stick 4c of FIG. 6 or the yaw pedals 4d of FIG. 6 fixed, i.e. not moving. After complete loss of both smart electro-mechanical series actuators 31a, 31b, the higher performance capabilities of the tactile cue actuator 12 in comparison to the classical trim actuator like the gradient trim actuator 11 of FIG. 2 make it possible to stabilize the helicopter by means of the said tactile cue actuator 12 with the stick moving in pilot hands-off operation.

It should be noted that above with reference to FIG. 1 to FIG. 6 separate configurations are described for artificial force feel generation related to cyclic pitch control, collective pitch control and yaw control in a helicopter. However, as already mentioned above, these separate configurations are preferably combined, either in part or completely, in one common vehicle control system of a given helicopter. Accordingly, a vehicle control system can be implemented that is suitable for generation of artificial force feel for a pilot of the given helicopter with artificial forces counteracting pilot control input for warning the pilot about undesirable, disadvantageous and/or dangerous flight and/or operating states and/or for inhibiting undesirable, disadvantageous and/or dangerous pilot control input on any of the flight control axes.

According to one aspect, the AFCS is configured to alert the pilot and to ramp down a respective counteracting force of the soft stop after a predefined time interval, if the AFCS detects permanent or enduring violation of generated soft stops by the pilot. Thus, on the one hand the pilot is allowed to fly how he wants, which may e.g. be required in emergency situations, and on the other hand the electrical motor of the tactile cue actuator is protected from overheating, i.e. from thermal damage. More specifically, the vehicle control system 10 is configured in a way so that before ramping down the respective counteracting force of the soft stop generated by the tactile cue actuator 12, the pilot will be warned or alerted by the vehicle management system 8 via visual cues like instrument indication or aural cues, e.g. so-called gongs.

In particular, the AFCS is configured to assist the pilot by means of the artificial force feel generating device in reducing or limiting mechanical loads on structural components of the helicopter.

More specifically, the artificial force feel generating device is preferably configured for assisting the pilot in limiting occurrence of excessive rotor mast bending moments during flight or on ground, e.g. due to slope landings or cross wind.

Furthermore, the vehicle control system 10 is preferably configured to assist the pilot by means of the artificial force feel generating device 6 in reducing or limiting loads on the whole rotor 2, especially rotor hub and blade root. More specifically, the cyclic control authority and rate of the pilot command input is limited as a function of environmental conditions, flight conditions and weight of the helicopter 1.

Furthermore, the vehicle control system 10 is preferably configured to assist the pilot by means of the artificial force feel generating device 6 in limiting cyclic pilot command input to protect from dynamic rollover.

Furthermore, the vehicle control system 10 is preferably configured to assist the pilot by means of the artificial force feel generating device 6 in reducing or limiting blade flapping which could lead to excessive vibrations or could lead to damage of the helicopter 1 due to collision of the main rotor 2 with the tail boom 1b.

Furthermore, the vehicle control system 10 is preferably configured to assist the pilot by means of the artificial force feel generating device 6 in reducing or limiting loads on the tail rotor and/or the tail boom with the benefit of reducing structural weight. More specifically, the tactile cue actuator 12 is preferentially used to limit the yaw angle of the helicopter 1 as well as the full stroke authority and the maximum possible speed of pilot command input via the pedals as a function of speed of forward flight and air density.

The artificial force feel generating device is preferably configured for assisting the pilot in preventing collisions with obstacles and or air traffic avoidance.

According to one aspect, the inventive artificial force feel generating device is further configured for providing an advanced flight domain limitation. More specifically, the artificial force feel generating device is preferably configured for assisting the pilot in avoiding rotor overspeed, for protecting the main engine(s) with respect to rotor speed in general and corresponding thermal limits, both in short and in continuous or long term, and/or for protecting the main gearbox with respect to an excessive torque generation.

REFERENCE LIST 1 rotary wing aircraft
1a fuselage
1b tail boom
1c wheel-type landing gear
2 multi-blade main rotor
2a, 2b rotor blades
2c rotor head
2d rotor mast
3 tail rotor
4 main rotor pitch control unit
4a cyclic pitch inceptor
4b grip reference point
4c collective pitch inceptor
4d yaw inceptor
5 mechanical linkage
5a servo drive unit
5b optional friction and damping unit
6 artificial force feel generating device
6a mechanical connection
6b rotary output unit
7 automatic flight control system
7a control and monitoring unit
7b automatic flight control system power electronics
8 vehicle management system
9a rotor mast bending moment sensor
9b weight-on-wheel sensors
10 control system
11 gradient trim actuator
11a safety unit
11b spring unit
11c reversible gear unit
11d trim release unit
11e irreversible gear unit
11f brushed DC motor unit
11g release damping unit
11h inceptor movement detector
11i friction unit
12 tactile cue actuator
12a reversible gear unit
12b brushless DC motor unit
12c motor position sensor
12d control and monitoring unit
12e tactile cue trim rotary output position sensor
12f tactile cue actuator power electronics
13 control range indications
13a first diagram
13b second diagram
13c third diagram
14a pitch direction
14b roll direction
15a first limited control range indication
15b second limited control range indication
15c third limited control range indication
16 main gearbox
16a main gearbox torque sensor
16b main gearbox input shaft
17 main engine
17a main engine speed and/or temperature sensors
18 full authority digital engine control
19 mechanical linkage
19a servo drive unit
20 air speed, air density and/or outside air temperature sensor
21 mechanical friction device
22 inceptor deflection-torque diagram
22a deflection-torque characteristics
22b inceptor absolute torque
22c inceptor deflection
22d inceptor torque
23a maximum tactile cue actuator deflection
23b maximum tactile cue actuator torque
23c maximum negative tactile cue actuator torque
23d minimum stroke
23e maximum stroke
24a minimum pilot override force
24b maximum pilot override force
24c minimum friction
24d force trim release
25a nominal inceptor breakout torque
25b positive inceptor breakout force
25c negative inceptor breakout force
25d zero force anchoring position
26a normal continuous function domain
26b time limited function domain
26c override function domain
26d artificial force feel/tactile cues adjustability domain
27a backdriving gradient ramp
27b soft stop ramp
27c nominal positive gradient
27d nominal negative gradient
28a power control electronics
28b motor/generator
28c backup damping resistor
29 stiffness slope
30 obstacle detecting rotor strike alerting system
30a potentially striking object
31a first smart electro-mechanical actuator
31b second smart electro-mechanical actuator

What is claimed is:

1. An artificial force feel generating device for generation of an artificial feeling of force on an inceptor of a vehicle control system, the inceptor being adapted for controlling a servo-assisted control unit of the vehicle control system via a mechanical linkage, the artificial force feel generating device comprising a first force generating device and a second force generating device, wherein the first force generating device and the second force generating device are mechanically connected to the inceptor, the first force generating device being provided for generating a nominal force acting in operation on the inceptor and the second force generating device being provided for generating a tactile cue force acting in operation on the inceptor, the first and second force generating devices being arranged in parallel.

2. The artificial force feel generating device according to claim 1, wherein the first force generating device comprises at least one mechanical force generating unit.

3. The artificial force feel generating device according to claim 2, wherein the at least one mechanical force generating unit is a spring unit.

4. The artificial force feel generating device according to claim 2, wherein the at least one mechanical force generating unit is a friction unit.

5. The artificial force feel generating device according to claim 2, wherein the first force generating device comprises a coupling unit coupling the at least one mechanical force generating unit to the inceptor, the coupling unit being activatable for de-coupling the at least one mechanical force generating unit from the inceptor while the second force generating device remains mechanically connected to the inceptor.

6. The artificial force feel generating device according to claim 5, wherein an electrical motor is provided for shifting a predetermined trim position of the inceptor on request of an automatic motion control system or a vehicle driver.

7. The artificial force feel generating device according to claim 1, wherein a safety unit is provided for limiting authority of the first and/or second force generating devices.

8. The artificial force feel generating device according to claim 1, wherein the first and second force generating devices are connected to the inceptor by means of a rotary output unit that is connected to a position sensor adapted for monitoring a rotational position of the rotary output unit in operation, and wherein a safety unit is provided that is adapted for disconnecting the first and/or second force generating devices from the inceptor while the position sensor remains connected to the inceptor.

9. The artificial force feel generating device according to claim 1, wherein the second force generating device comprises at least one electrical force generating unit.

10. The artificial force feel generating device according to claim 9, wherein the at least one electrical force generating unit is an electrical motor.

11. The artificial force feel generating device according to claim 10, wherein power electronics are provided for controlling the electrical motor.

12. The artificial force feel generating device according to claim 1, wherein the vehicle control system comprises an automatic motion control system that is adapted for driving the second force generating device.

13. The artificial force feel generating device according to claim 12, wherein the automatic motion control system is adapted for driving the second force generating device on the basis of sensor information obtained via at least one associated sensor.

14. The artificial force feel generating device according to claim 13, wherein the vehicle is a rotary wing aircraft, the at least one associated sensor comprising at least one of a rotor mast bending moment sensor and/or an obstacle detecting rotor strike alerting sensor.

15. The artificial force feel generating device according to claim 13, wherein the vehicle control system comprises a vehicle management system that is electrically connected to the at least one associated sensor, the vehicle management system being connected to the automatic motion control system for providing the sensor information to the automatic motion control system.

16. The artificial force feel generating device according to claim 1, wherein the first and second force generating devices are connected to the inceptor by means of a rotary output unit.

17. The artificial force feel generating device according to claim 1, wherein the nominal force and the tactile cue force act in operation on the inceptor for moving the inceptor into a neutral position, the neutral position defining a trim point that determines a preferred motion direction of a vehicle that comprises the inceptor.

18. The artificial force feel generating device according to claim 17, wherein the vehicle is an aircraft or a watercraft or a helicopter.

19. The artificial force feel generating device according to claim 18, wherein the first force generating device is implemented as a gradient trim actuator and/or a mechanical friction actuator, and wherein the second force generating device is implemented as a tactile cue actuator.

20. An aircraft with a vehicle control system comprising an inceptor that is adapted for controlling a servo-assisted control unit of the vehicle control system via a mechanical linkage, the vehicle control system further comprising an artificial force feel generating device for generation of an artificial feeling of force on the inceptor, wherein the artificial force feel generating device includes a first force generating device and a second force generating device that are mechanically connected to the inceptor, the first force generating device being provided for generating a nominal force acting in operation on the inceptor and the second force generating device being provided for generating a tactile cue force acting in operation on the inceptor, the first and second force generating devices being arranged in parallel.

21. A method of controlling an aircraft with a vehicle control system including (i) an inceptor that is adapted for controlling a servo-assisted control unit of the vehicle control system via a mechanical linkage and (ii) an artificial force feel generating device for generation of an artificial feeling of force on the inceptor, wherein the artificial force feel generating device includes a first force generating device and a second force generating device that are mechanically connected to the inceptor and are arranged in parallel, the first force generating device being provided for generating a nominal force acting in operation on the inceptor and the second force generating device being provided for generating a tactile cue force acting in operation on the inceptor, the method comprising at least the step of generating in operation of the aircraft an artificial feeling of force on an inceptor of the aircraft by means of the artificial force feel generating device, in order to assist a pilot of the aircraft in "hands-on" operation of the aircraft via the generated artificial feeling of force.

\* \* \* \* \*